United States Patent
Hasebe et al.

(10) Patent No.: US 7,000,114 B1
(45) Date of Patent: Feb. 14, 2006

(54) APPARATUS TO CREATE AND/OR VERIFY DIGITAL SIGNATURES HAVING A SECURE TIME ELEMENT AND AN IDENTIFIER OF THE APPARATUS

(75) Inventors: Takayuki Hasebe, Kanagawa (JP); Seigo Kotani, Kanagawa (JP); Ryota Akiyama, Kanagawa (JP); Takaoki Sasaki, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/549,551

(22) Filed: Apr. 14, 2000

(30) Foreign Application Priority Data

May 31, 1999 (JP) ................................ 11-151709

(51) Int. Cl.
*H04L 9/00* (2006.01)
(52) U.S. Cl. ................. 713/176; 713/170; 713/180
(58) Field of Classification Search ............... 713/176, 713/170, 180
See application file for complete search history.

(56) References Cited

U.S. PATENT DOCUMENTS

| 4,230,958 | A | * | 10/1980 | Boll et al. ..................... 327/18 |
| 4,254,469 | A | * | 3/1981 | Whitely ........................ 702/87 |
| 4,295,041 | A | * | 10/1981 | Ugon ......................... 235/487 |
| 4,458,109 | A | | 7/1984 | Mueller-Schloer |
| 5,097,504 | A | * | 3/1992 | Camion et al. ............. 713/176 |
| 5,115,425 | A | * | 5/1992 | Ardon ........................ 370/217 |
| 5,136,643 | A | * | 8/1992 | Fischer ....................... 713/178 |
| 5,136,646 | A | * | 8/1992 | Haber et al. ................. 713/178 |
| 5,189,700 | A | * | 2/1993 | Blandford ................... 713/178 |
| 5,422,953 | A | * | 6/1995 | Fischer ....................... 713/172 |
| 5,444,780 | A | * | 8/1995 | Hartman, Jr. ................. 380/30 |
| 6,072,874 | A | * | 6/2000 | Shin et al. ................... 380/231 |
| 6,081,899 | A | * | 6/2000 | Byrd .......................... 713/201 |
| 6,289,453 | B1 | * | 9/2001 | Walker et al. ............... 713/175 |
| 6,298,153 | B1 | * | 10/2001 | Oishi ......................... 382/186 |

FOREIGN PATENT DOCUMENTS

| JP | HEI 3-185551 A | 8/1991 |
| JP | 07-036559 | 2/1995 |
| JP | HEI 7-254897 A | 10/1995 |
| JP | HEI 8-328470 A | 12/1996 |
| JP | 2606827 | 2/1997 |
| JP | 9-101967 | 4/1997 |
| JP | 10-020782 | 1/1998 |
| JP | 10-268763 | 10/1998 |

OTHER PUBLICATIONS

Schneier, Bruce; Applied Cryptography; 1996; John Wiley & Sons, Inc.; 2nd Edition; pp. 21-46, 169-187.*
Unknown author; "The Arithmetic and Logic Unit (ALU)"; Aug. 6, 1998; pp. 1-5.*
Haber et al.;"How to Time-Stamp a Digital Document"; "Advances in Cryptography—Crypto '90," Springer-Verlag, LNCS.*
Code and Information Security; Shigeo Tsujii et al., ISBNY—7856-3075-2, pp 223-234.

* cited by examiner

Primary Examiner—Gilberto Barron, Jr.
Assistant Examiner—Jung W. Kim
(74) Attorney, Agent, or Firm—Staas & Halsey LLP

(57) ABSTRACT

In a signature creating apparatus, a clock generates a time stamp and in which time can be set only by a computer installed in a certificate authority center. Further, connecting sections connects an apparatus ID for specifying an apparatus and the time stamp and personal identification information for identifying an implementor to a plain-text so as to create data for the signature. A signature creating circuit encrypts the data for the signature using a signature creating key or the like and generates the signature. A connecting section connects the signature to the data for the signature and transmits the data as data after signature.

7 Claims, 14 Drawing Sheets

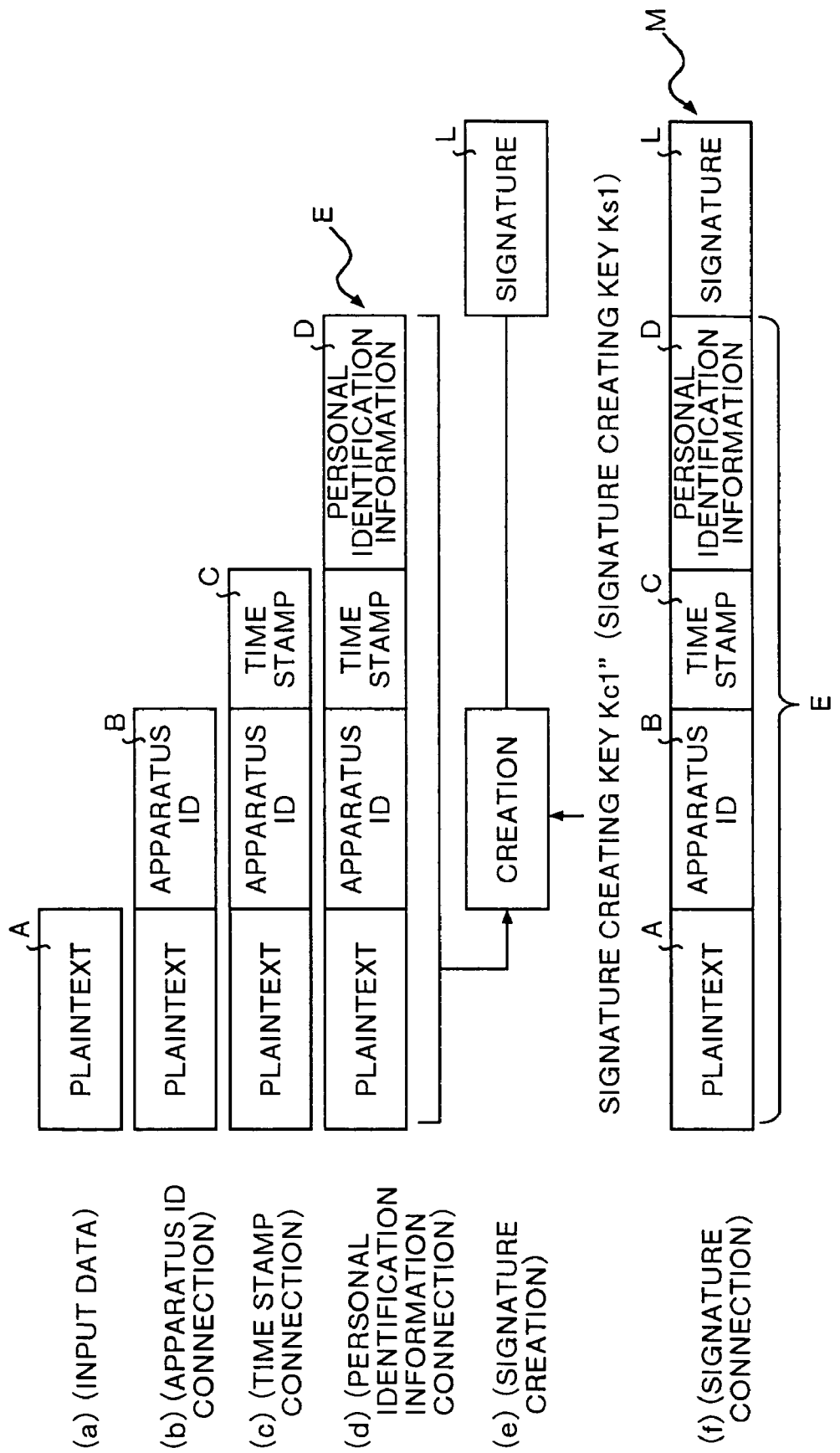

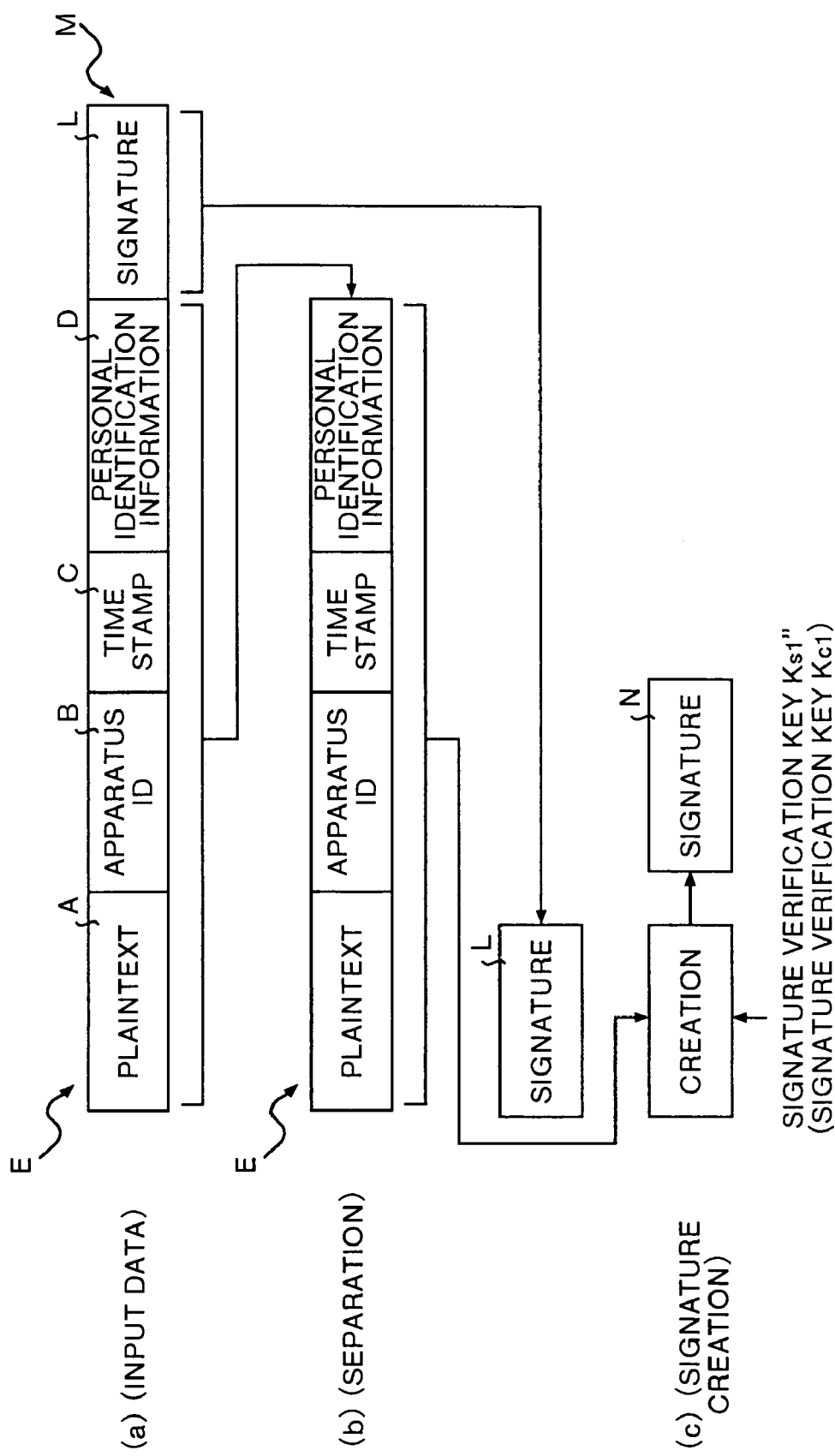

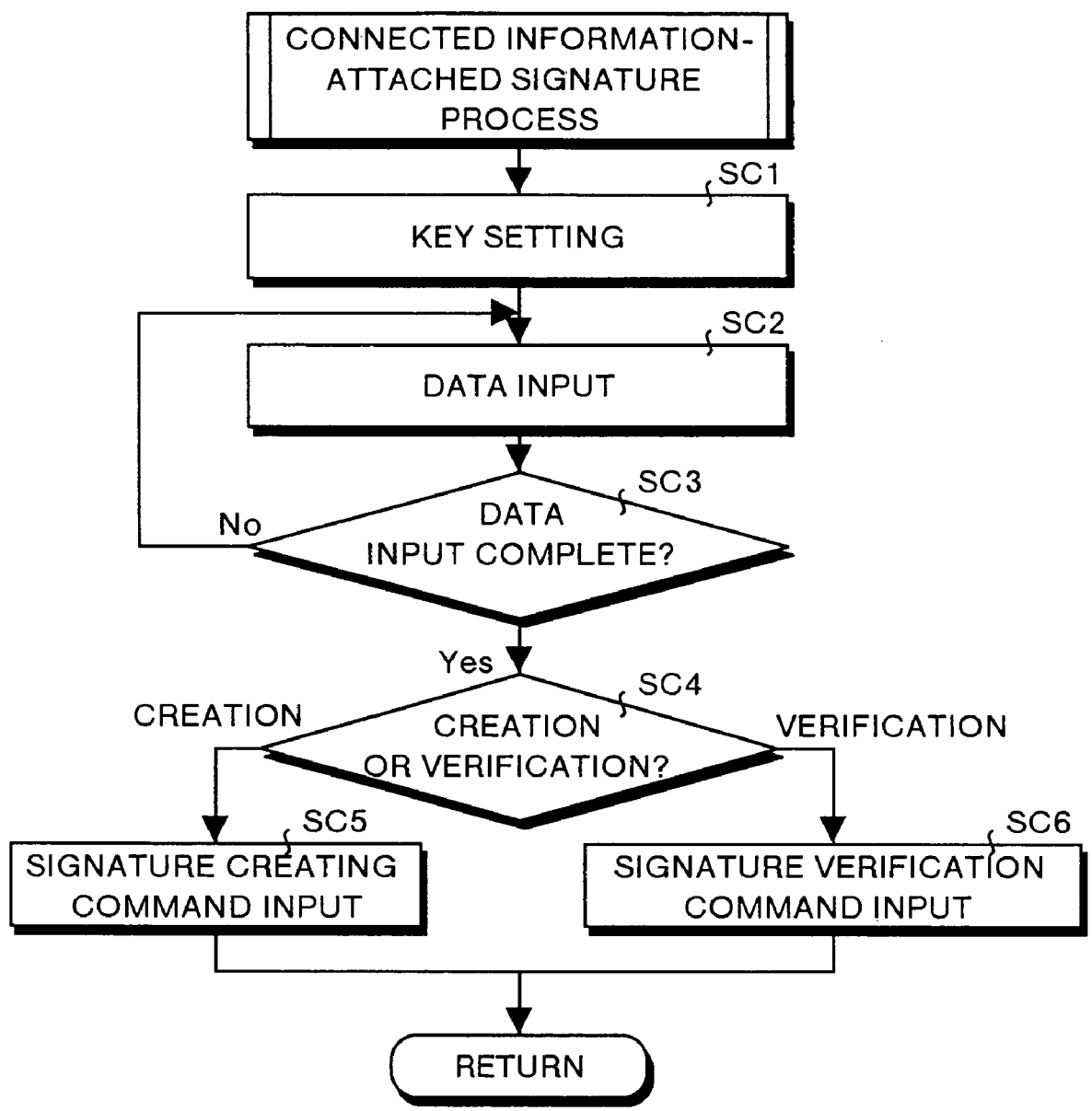

APPARATUS TO CREATE AND/OR VERIFY DIGITAL SIGNATURES HAVING A SECURE TIME ELEMENT AND AN IDENTIFIER OF THE APPARATUS

FIELD OF THE INVENTION

The present invention relates to a signature creating apparatus, a signature verification apparatus and a signature apparatus which prevent interpolation of electronic information. More particularly, this invention relates to a signature creating apparatus, a signature verification apparatus and a signature apparatus which verify a signature date and time, a signature apparatus, a signer and the like via a digital signature using cryptographic technology so as to efficiently prevent the interpolation.

BACKGROUND OF THE INVENTION

In order to meet the demands of paperless process, documents, forms and the like which have been processed in the form of paper are processed as electronic information by computers gradually. In the case where such a kind of electronic information is treated, there is a possibility that a third party who poses as a person who created the electronic information interpolates the electronic information. Therefore, a digital signature technique using the cryptographic technique has conventionally attracted attention as a technique for verifying that the electronic information is not interpolated. In particular, in the case where electronic information is exchanged via an intranet or the Internet which have rapidly wide spread recently, the digital signature technique becomes indispensable as a technique for securing security.

When electronic information (hereinafter, referred to as plain-text) is transmitted via an Intranet or Internet, in order to verify that the contents of the plain-text are not interpolated, after the plain-text is encrypted by using a signature key and a digital signature is created, and the plain-text to which the digital signature is added is transmitted. Further, a receiving side verifies based on the digital signature whether or not the electronic information is interpolated. A signature apparatus is used for the creation/verification of such a digital signature.

Here, a common key method or a public key method, which are typical cryptographic methods, is adopted to the creation/verification of the digital signature. The common key method is characterized in that a creating side (transmission side) and a verification side (receiving side) have a common key, and as typical algorithm of the common key method, a well-known DES (Data Encryption Standard) is used as a substantial standard in this industry. In the case where this common key method is used, in the signature apparatus on the creating side, after the plain-text which was encrypted by using a common key is created as a digital signature, the plain-text to which the digital signature is added is transmitted via the network or the like.

When the plain-text to which the digital signature was added is received, after the signature apparatus on the verification side encrypts the plain-text using the common key so as to create a digital signature, the signature apparatus compares this digital signature with the received digital signature and verifies as to whether or not the received plain-text is interpolated based on the compared result. Namely, the signature apparatus on the verification side verifies that the plain-text is not interpolated when both the digital signatures are corresponding, and verifies that the plain-text is interpolated when both the digital signatures are not corresponding.

Meanwhile, the public key method is a method in which a cryptographic key and a decoding key exist separately. One key is called a public key which is opened to a third party, and the other key is called as a private key which is owned by only a user. Since this public key method is a method which is carried out by using two keys: the public key and private key, encryption and decoding cannot be carried out without the public key and private key. Here, as typical algorithm of the public key method, well-known RSA (the first letters of three people: Rivest, Shamir, Adleman) is used.

In the digital signature using the public key method, the implementor opens his/her public key to third parties and holds the private key. Here, the implementor's public key is a key which any third parties except the implementor can know and the implementor's private key is a key which only the implementor can know.

In the case of using the public key method, in the signature apparatus on the creating side, a plain-text composed of bit strings of arbitrary length is compressed (transformed) into a fixed-length bit string by hash function so that a digest is created. The hash function has one direction such that the plain-text before transformation can be hardly got from the transformed digest mathematically. On the signature apparatus on the creating side, after the digest which is encrypted by using the implementor's private key is created as a digital signature, the plain-text to which the digital signature is added is transmitted via the network or the like.

When the plain-text to which the digital signature was added is received, the signature apparatus on the verification side decodes the digital signature using the implementor's public key and verifies as to whether or not the received plain-text is created by the proper implementor based on the decoded result. Namely, when the received digital signature can be decoded by the implementor's public key, the signature apparatus on the verification side creates a digest as the decoded result, and verifies that the plain-text is created by the signature apparatus on the proper creating side (implementor). Meanwhile, when the received digital signature cannot be decoded by the implementor's public key, the signature apparatus on the verification side verifies that the received plain-text is created by a third party who poses as the proper creator.

Further, after the signature apparatus on the verification side creates a digest from the received plain-text using the hash function which is the same as that used in the signature apparatus on the creating side, the signature apparatus on the verification side compares this digest with the digest decoded by the implementor's public key so as to verify as to whether or not the transmitted plain-text is interpolated. Namely, the signature apparatus on the verification side verifies that the plain-text is not interpolated when both the digests are not corresponding, and verifies that the plain-text is interpolated when both the digests are not corresponding.

As for documents such as clinical charts, tax forms and minute books, it is necessary to defend against an illegal act such that the date and time is interpolated and a new document is created by an implementor having the proper right in the case where there arises a problem later. The above-mentioned digital signature technique is applied to such a defense. Namely, in this case, date and time information is obtained from the clock of the signature apparatus and it is added as time stamp to an electronic plain-text obtained from the document and digital signature is added to this plain-text, thereby it becomes possible to verify that the signature date and time is proper. Here, as for the details of the time verification using a time stamp, see Japanese Patent Application Laid-Open Nos. 3-185551, 7-254897 and U.S. Pat. No. 4,458,109.

As mentioned above, in the conventional signature apparatuses, a digital signature is added to a plain-text to which a time stamp is added so that the signature date and time is verified. However, in the case of an apparatus where an implementor can easily change a time counted result of the clock with the intention of using it illegally, if the implementor easily interpolates a content (date and time) of a time stamp into a past date and time, validity of the signature date and time is not guaranteed, and the digital signature is not valid legally.

In addition, in the conventional signature apparatus using the common key method, since a creating side and a verification side use the common key in common, an improper verifier poses as a proper implementor and can add a digital signature to a received plain-text. Therefore, in this case, there arises a problem such that the validity of the person who made the digital signature cannot be guaranteed. Namely, in this case, there arises a problem such that a person (apparatus) who (which) made a digital signature cannot be specified.

Further, in business organizations and the like, information about a person who made a digital signature (for example, name of official position, name and the like) is very important. For this reason, since an organization of an office is frequently changed in the business organizations and the like, a signature apparatus which can flexibly deal with such a change is requested.

SUMMARY OF THE INVENTION

It is an object of this invention to provide a signature creating apparatus, a signature verification apparatus and a signature apparatus which are capable of preventing interpolation of date and time, and of specifying a person or apparatus who/which made a digital signature, and of dealing with the change in information about an implementor flexibly.

According to one aspect of this invention, time information of a clock is set only by a time authentication authority. Therefore, the time is not interpolated improperly by a third party. Further, a connecting unit connects the time information and an apparatus ID to a plain-text and creates a connection data, after that a signature creating unit creates a digital signature based on the connection data and a key only for signature creating. In such a manner, the time information of the clock is set only by the time authentication authority and the digital signature is created using the connection data including the time information and the apparatus ID and by the keys only for signature. Therefore, interpolation of the date and time can be prevented, and the apparatus which has created the digital signature can be specified.

Further, when the connecting unit connects personal identification information as well as the time information, the apparatus ID to the plain-text, the signature creating unit creates the digital signature. In such a manner, the connection data including personal identification information are used so that the digital signature is created. Therefore, an implementor of the digital signature can be specified easily in the verification side, and the invention can deal with a change in the information about the implementor flexibly.

Further, a judging unit judges as to whether or not a person who updates the stored contents of a storage unit (personal identification information) has a person who has proper right, and only when it is judged that the person who updates has the proper right, an updating unit updates the stored contents. In such a manner, by providing the judging unit, the third party who updates the personal identification information illegally can be eliminated. Therefore, the security is improved.

Further, the apparatus ID is stored in an unrewritable storage unit (for example, one-time ROM), interpolation of the apparatus ID can be prevented. Therefore, the security is further improved.

Further, only in the case where it is confirmed by a confirming unit that the clock works normally, the signature creating unit creates the digital signature. Therefore, the reliability of the time information is maintained at high level.

Further, in the case where the clock do not work normally due to malfunction or the like, namely, in the case where the digital signature cannot be created based on the connection data including the time information, the using of the keys only for signature creating is stopped, and the digital signature can be created by using the connected information not including the time information and the keys other than the keys only for signature creating. Therefore, generality is improved.

Further, in the compared result of the driving voltage and the threshold, in the case, for example, where the driving voltage of the clock is lower than the threshold, the confirming unit confirms that the clock does not work normally. Therefore, the reliability of the time information is maintained at high level.

Further, in a compared result of a time-counted result before a certain time and a time-counted result at the current time, in the case, for example, where both the time-counted results are corresponding, the confirming unit confirms that the clock stops. Therefore, the reliability of the time information is maintained at high level.

Further, only in the case where the flag is brought into ON state by the confirming unit, namely, only in the case where the clock works normally, the signature creating unit creates the digital signature. Therefore, the digital signature where the time information has high reliability is created.

Further, a setting unit which is installed in the time authentication authority sets time of the clock according to the time setting request. Therefore, a third party is efficiently prevented from interpolating the time illegally.

Further, a correcting unit corrects the clock automatically. Therefore, the accuracy of the time information obtained from the clock can be maintained at high level.

According to another aspect of this invention, a digital signature is created by using a connection data including an apparatus ID for specifying a creating apparatus and keys only for signature, in a common key method. Therefore, the apparatus which has created the digital signature can be specified in a verification side.

According to still another aspect of this invention, when a plain-text to which a digital signature is connected is received by a receiving unit, a signature verification unit verifies interpolation using the digital signature, the plain-text and a key only for signature verification. In such a manner, the digital signature is verified based on a connection data including authorized time information and an apparatus ID. Therefore, interpolation of the date and time can be prevented, and an apparatus which has created the digital signature can be specified.

Further, cryptographic information is provided by an high-reliable authority such as the key authentication authority, and the cryptographic information is decoded by a signature verification key generating unit so that keys only for signature verification are generated. Therefore, the security in the apparatus can be heightened extremely.

According to still another aspect of this invention, a signature creating function and a signature verification function are provided in one apparatus. Namely, when the signature creating function is brought into an effective state by a function selecting unit, the apparatus serves as a signature creating apparatus, and when the signature verification function is brought into an effective state by the function selecting unit, the apparatus serves as a signature verification apparatus. Therefore, generality can be improved.

Further, when the function is switched to the function as the upper apparatus by a switching unit and the signature verification function is made to be effective by the function selecting unit, the signature apparatus functions as the signature verification apparatus. Further, in a state that another signature apparatus has the function as the lower apparatus and serves as the signature creating apparatus, when a digital signature is created, a key only for signature verification is created based on an apparatus ID of the lower apparatus by a key generating unit in the upper apparatus having the signature verification function. As a result, the signature verification unit of the upper apparatus verifies interpolation based on the digital signature from the lower apparatus using the key only for signature verification. In such a manner, even in the case where a plurality of lower apparatuses exist, the apparatus IDs of the lower apparatuses are managed by the upper apparatus. Therefore, strict management is not required unlike the case where common keys of plural lower apparatuses are managed.

Other objects and features of this invention will become apparent from the following description with reference to the accompanying drawings.

BRIEF DESCRIPTION OF THE DRAWINGS

FIG. 3 is a diagram showing data transition in the first embodiment.

FIG. 4 is a diagram showing data transition in the first embodiment.

FIG. 14 is a flow chart showing a connected information-attached signature process according to the third embodiment.

DESCRIPTION OF THE PREFERRED EMBODIMENTS

There will be detailed below a signature creating apparatus, a signature verification apparatus and a signature apparatus according to three embodiments of the present invention with reference to the drawings.

Figure 1:
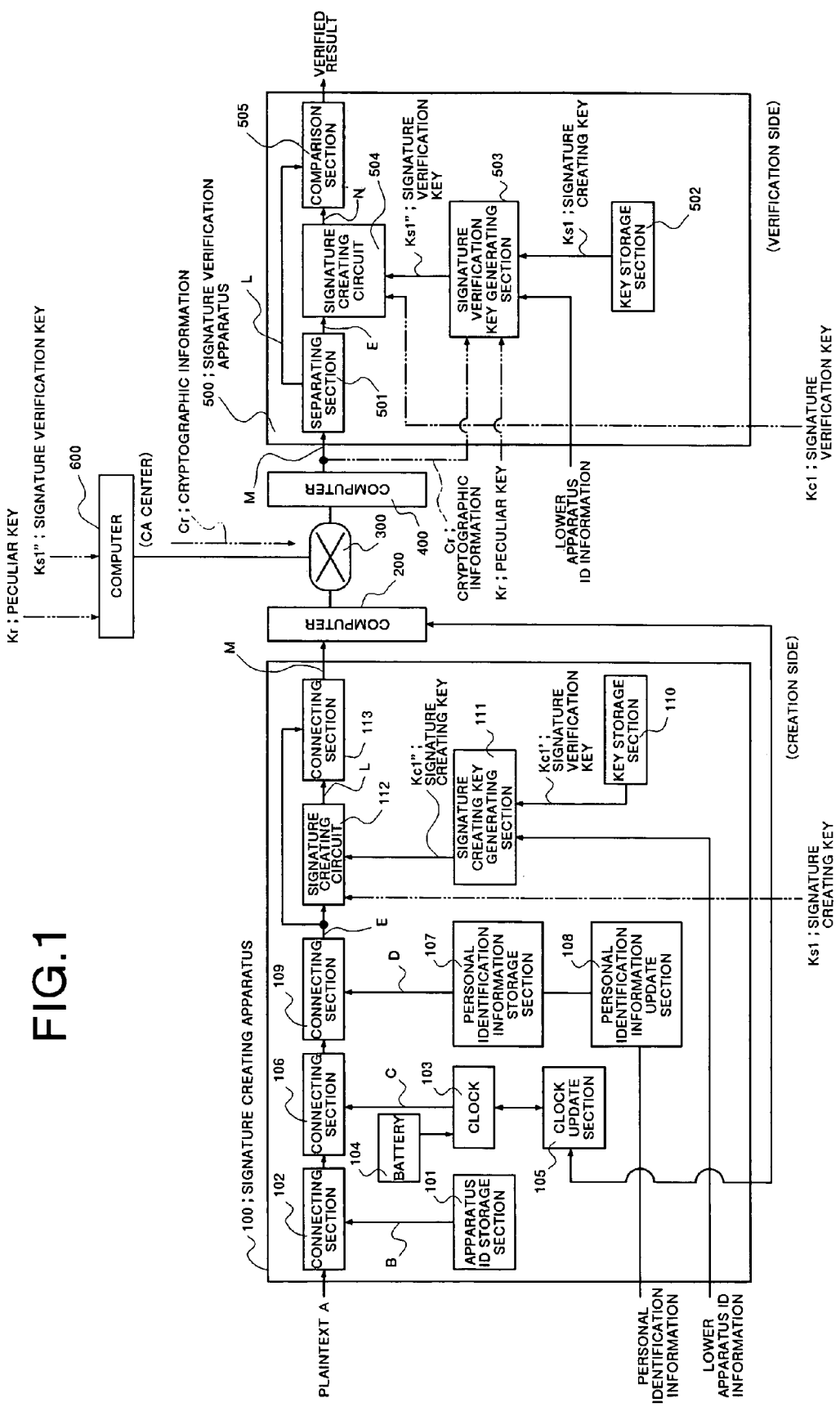
FIG. 1 is a block diagram showing a structure according to a first embodiment of the present invention.

FIG. 1 is a block diagram showing a structure according to the first embodiment of the present invention. FIG. 1 shows a signature creating apparatus 100 for creating a digital signature using a common key method, and a signature verification apparatus 500 for verifying based on the created digital signature. In the drawing, the signature creating apparatus 100 is connected with a computer 200 installed in a digital signature creating side, and this apparatus creates a digital signature for an electronic plain-text A (see (a) in FIG. 3) as input data. Actually, the signature creating apparatus 100 is of a portable card type, and it is inserted into a card slot of the computer 200 so as to be connected therewith. The details of the signature creating apparatus 100 will be mentioned later.

The computer 200 is connected with a network 300 such as Intranet, local area network or the Internet, and has function for transmitting signed data M (see (f) in FIG. 3) from the signature creating apparatus 100. A computer 400 is installed in a digital signature verification side and is connected with the network 300. The computer 400 has function for receiving the signed data M transmitted from the computer 200. A signature verification apparatus 500 verifies validity of the signed data M. Similarly to the signature creating apparatus 100, the signature verification apparatus 500 is of a portable card type, and is inserted into a card slot of the computer 400 so as to be connected therewith. A computer 600 is installed in a CA (Certificate Authority) center, and sets and authenticates time of a clock 103, mentioned later, of the signature creating apparatus 100. The CA center is the time authentication authority in which users put absolute confidence as for time authentication. Moreover, the CA center have absolute user's confidence as to the authentication of keys to be used for digital signature and encryption/decoding, and it is a key authentication authority which issues public key certification or the like.

Figure 2A:
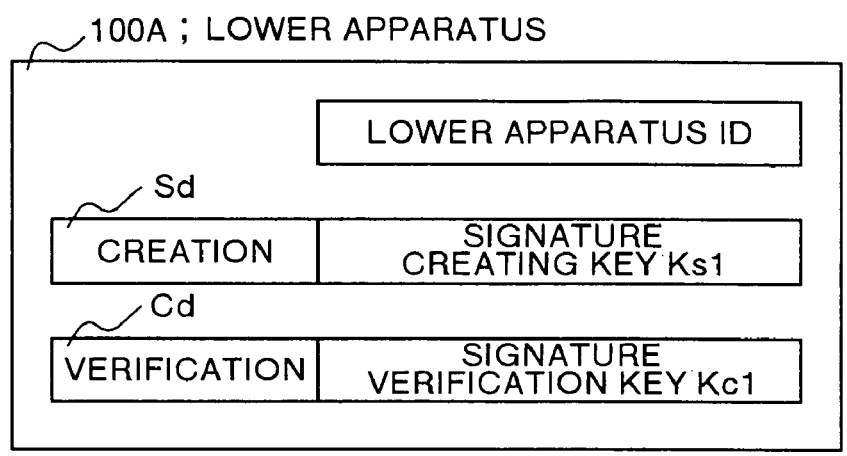
FIG. 2A and FIG. 2B are diagrams showing a relationship between a lower apparatus 100A and an upper apparatus 100B according to the first embodiment.

In addition, as the function of the signature creating apparatus 100 on the creating side, there exist function as the lower apparatus and function as the upper apparatus. Similarly, as the function of the signature verification apparatus 500 on the verification side, there exist function as the lower apparatus and function as upper apparatus. There will be described below a relationship between the lower apparatus and the upper apparatus with reference to FIG. 2A and FIG. 2B. The lower apparatus 100A shown in FIG. 2A holds a lower apparatus ID (Identification number) and a signature creating key $K_{s1}$ and a signature verification key $K_{c1}$. The lower apparatus ID specifies the lower apparatus 100A. The signature creating key $K_{s1}$ is only for creating a digital signature, and it is implemented so as not to be used for another purpose. Creation attribute data $S_d$ which represent a key only for creation are added to the signature creating key $K_{s1}$. The signature verification key $K_{c1}$ is only for verifying a digital signature, and it is implemented so as not to be used for another purpose. Verification attribute data $C_d$ which represent a key only for verification are added to the signature verification key $K_{c1}$.

Figure 2B:
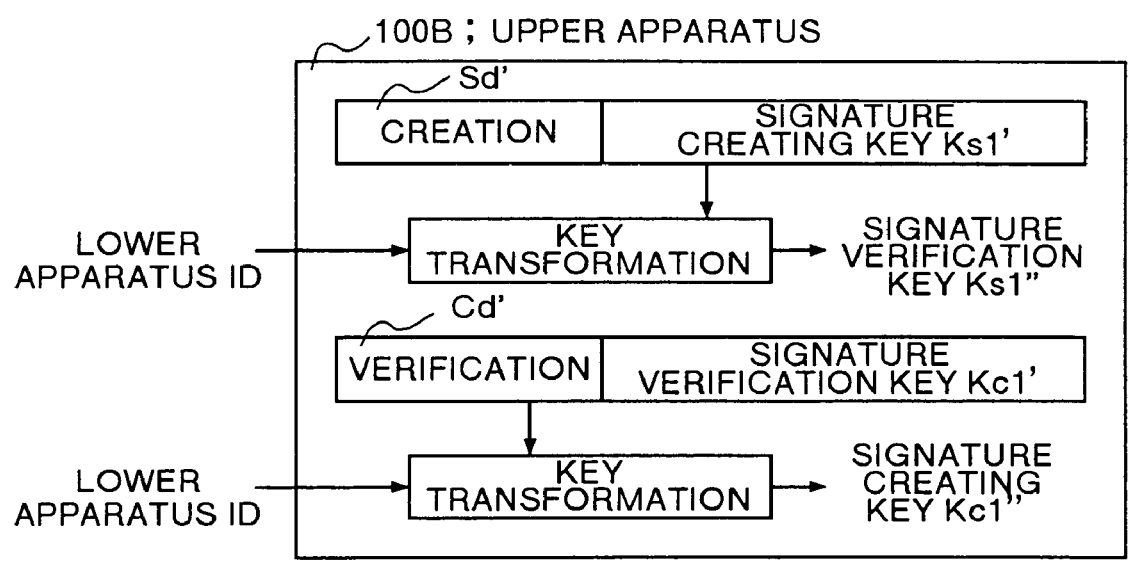

Meanwhile, the upper apparatus 100B shown in FIG. 2B holds a signature creating key $K_{s1}'$ to which creation attribute data $S_d'$ similar to the creation attribute data $S_d$ are added, and a signature verification key $K_{c1}'$ to which verification attribute data $C_d'$ similar to the verification attribute data $C_d$ are added. Further, the upper apparatus 100B includes function for transforming the signature creating key $K_{s1}'$ into a signature verification key $K_{s1}''$ using the lower apparatus ID. For example, the signature verification key $K_{s1}'$ is obtained by encrypting the lower apparatus ID using the signature creating key $K_{s1}'$, and it is only for verifying a digital signature. The signature verification key $K_{s1}'$ and signature creating key $K_{s1}$ of the lower apparatus 100A are paired, and they are common keys in the common key method. Therefore, a digital signature, which is created by using the signature creating key $K_{s1}$ in the lower apparatus 100A, can be verified only by the signature verification key $K_{s1}''$ generated in the upper apparatus 100B.

Further, the upper apparatus 100B has function for transforming the signature verification key $K_{c1}'$ into a signature creating key $K_{c1}''$ using the lower apparatus ID. The signature creating key $K_{c1}''$ is obtained by encrypting the lower apparatus ID by the signature verification key $K_{c1}'$ and it is only for creating a digital signature. The signature creating key $K_{c1}''$ and the signature verification key $K_{c1}$ of the lower apparatus 100A are paired, and they are common keys in the common key method. Therefore, a digital signature, which is created by using the signature creating key $K_{c1}''$ in the upper apparatus 100B, can be verified only by the signature verification key $K_{c1}$ of the lower apparatus 100A.

By using the above method, even in the case where a plurality of lower apparatuses 100A exist, since the upper apparatus 100B manages lower apparatus IDs, strict management is not required unlike the case where respective common keys of the plural lower apparatuses 100A are managed. Further, by using the above method, since only the lower apparatus 100A is determined as an apparatus which can create a digital signature using one of the common keys (signature creating key $K_{s1}$ or signature verification key $K_{s1}''$), the apparatus which has created the digital signature using one of the common keys can be specified. Similarly, since only the upper apparatus 100B is determined as an apparatus which can create a digital signature using the other common key (signature creating key $K_{c1}''$ or signature verification key $K_{c1}$), the apparatus which has created the digital signature can be specified by using the other common key.

The signature creating apparatus 100 shown in FIG. 1 has the function as the lower apparatus 100A (see FIG. 2A) or the function as the upper apparatus 100B (see FIG. 2B). Meanwhile, in the case where the signature creating apparatus 100 has the function as the lower apparatus 100A, the signature verification apparatus 500 has the function as the upper apparatus 100B. On the contrary, in the case where the signature creating apparatus 100 has the function as the upper apparatus 100B, the signature verification apparatus 500 has the function as the lower apparatus 100A.

In the signature creating apparatus 100, an apparatus ID storage section 101 stores an apparatus ID•B (see (b) in FIG. 3) for specifying the apparatus. The apparatus ID storage section 101 is composed of an unwritable storage device as one-time ROM (Read Only Memory) or the like. Therefore, in the signature creating apparatus 100, the apparatus ID•B cannot be changed from the outside. A connecting section 102 connects a plain-text A (see (a) in FIG. 3) inputted from the computer 200 to the apparatus ID•B (see (b) in FIG. 3) read from the apparatus ID storage section 101.

The clock 103 creates time information about time such as date and time to be used for the authentication of the date and time of the creation of a digital signature. A battery 104 for driving is provided in the clock 103. The battery 104 is a primary battery or a chargeable secondary battery. A clock update section 105 is used for updating (setting) time of the clock 103, and it accesses the computer 600 via the computer 200 and the network 300 so as to request time setting of the computer 600. Namely, time of the clock 103 can be set only by the computer 600 installed in the CA center. Moreover, in the clock update section 105 and the computer 600, a private key and a public key of the signature creating apparatus 100 are used so as to create and verify a digital signature.

A connecting section 106 connects the time information from the clock 103 as a time stamp C (see (c) in FIG. 3) to the data (plain-text A+apparatus ID•B) outputted from the connecting section 102. A personal identification information storage section 107 stores personal identification information D (see (d) in FIG. 3) for identifying a person who creates a digital signature. Examples of the personal identification information D are a name, a post and the like. A personal identification information update section 108 updates (input, change) the personal identification information D stored in the personal identification information storage section 107 based on personal identification information inputted from the outside. Person, who can update (input, change) the personal identification information D using the personal identification information update section 108, are limited to person who have the proper right. Therefore, in the signature creating apparatus 100, for example, security function, which is carried out by inputting a password, prevents improper updating (input, change) by a third party. A connecting section 109 connects the personal identification information D (see (d) in FIG. 3) to the data (plain-text A+apparatus ID•B+time stamp C) outputted from the connecting section 106, and assumes the connection data are data E for the signature.

In the case where the signature creating apparatus 100 has the function as the upper apparatus 100B (see FIG. 2B), a key storage section 110 stores the signature verification key $K_{c1}'$ to which the verification attribute data $C_d'$ are added. Moreover, in the case where the signature creating apparatus 100 has the function as the lower apparatus 100A (see FIG. 2A), the key storage section 110 stores the signature creating key $K_{s1}$ to which the creation attribute data $S_d$ are added. A signature creating key generating section 111 is used for the case where the signature creating apparatus 100 has the function as the upper apparatus 100B, and as described with reference to FIG. 2B, generates a signature creating key $K_{c1}''$ from the lower apparatus ID and the signature verification key $K_{c1}'$ so as to output it to a signature creating circuit 112. In the case where the signature creating apparatus 100 has the function as the lower apparatus 10A, the function of the signature creating key generating section 111 is stopped, and as shown by alternate long and two short dashes line, the signature creating key $K_{s1}$ (see FIG. 2A) is inputted into the signature creating circuit 112.

The signature creating circuit 112 encrypts the data E for the signature (see (d) in FIG. 3) via the signature creating key $K_{c1}''$ (or signature creating key $K_{s1}$) by using DES in the common key method so as to generate an authentication code (a digital signature) which is called as MAC (Message Authentication Code) This authentication code is outputted as a signature L (see (e) in FIG. 3). In the signature creating circuit 112, in the case where the signature creating apparatus 100 has the function as the upper apparatus 100B, the signature creating key $K_{c1}$" is used as the common key, and in the case where the signature creating apparatus 100 has the function as the lower apparatus 10A, the signature creating key $K_{s1}$ is used as the common key. A connecting section 113 connects the signature L to the data E for the signature and transmits it as the signed data M (see (f) in FIG. 3) to the computer 200. The computer 200 transmits the signed data M to the computer 400 via the network 300.

In the signature verification apparatus 500, a separating section 501 separates the signed data M (see (a) in FIG. 4) received by the computer 400 into the data E for the signature and the signature L as shown by (b) in FIG. 4. In the case where the signature verification apparatus 500 has the function as the upper apparatus 100B (see FIG. 2B, a key storage section 502 stores the signature creating key $K_{c1}$ to which the creating attribute data $S_d'$ are added. Moreover, in the case where the signature verification apparatus 500 has the function as the lower apparatus 100A (see FIG. 2A), the key storage section 502 stores the signature verification key $K_{c1}$ to which the verification attribute data $C_d$ are added. A signature verification key generating section 503 is used for the case where the signature verification apparatus 500 has the function as the upper apparatus 100B, and as described with reference to FIG. 2B, generates the signature verification key $K_{s1}$" from the lower apparatus ID (in this case, apparatus ID•B of the signature creating apparatus 100) and the signature creating key $K_{s1}'$ so as to output the signature verification key $K_{s1}$" to a signature creating circuit 504. In the case where the signature verification apparatus 500 has the function as the lower apparatus 100A, the function of the signature verification key generating section 503 is stopped, and as shown by alternate long and two short dashes line, the signature verification key $K_{c1}$ (see FIG. 2A) is inputted into the signature creating circuit 504.

The signature creating circuit 504 has the function similar to the signature creating circuit 112 of the signature creating apparatus 100, and it encrypts the data E for the signature (see (b) in FIG. 4) which were separated by the separating section 501 using the signature verification key $K_{s1}$" (or signature verification key $K_{c1}$) so as to generate an authentication code (digital signature) which is called MAC. This authentication code is outputted as a signature N (see (c) in FIG. 4). In the signature generating circuit 504, in the case where the signature verification apparatus 500 has the function as the upper apparatus 100B, the signature verification key $K_{s1}$" is used as the common key with the signature creating key $K_{s1}$ in the signature creating apparatus 100 having the function as the lower apparatus 100A. Further, in the case where the signature verification apparatus 500 has the function as the lower apparatus 100A, the signature verification key $K_{c1}$" is used as the common key with the signature creating key $K_{c1}$" in the signature creating apparatus 100 having the function as the upper apparatus 100B.

A comparison section 505 compares the signature L (see (b) in FIG. 4) separated by the separating section 501 with the signature N (see (c) in FIG. 4) created by the signature creating circuit 504 so as to verify as to whether or not the data E for the signature are interpolated. Namely, when both are corresponding, the comparison section 505 obtains the verified result that there is no interpolation, and when both of them are not corresponding, the comparison section 505 obtains the verified result that there is interpolation.

An operation of the first embodiment will be explained below with reference to the flow chart shown in FIG. 5.

Figure 5:
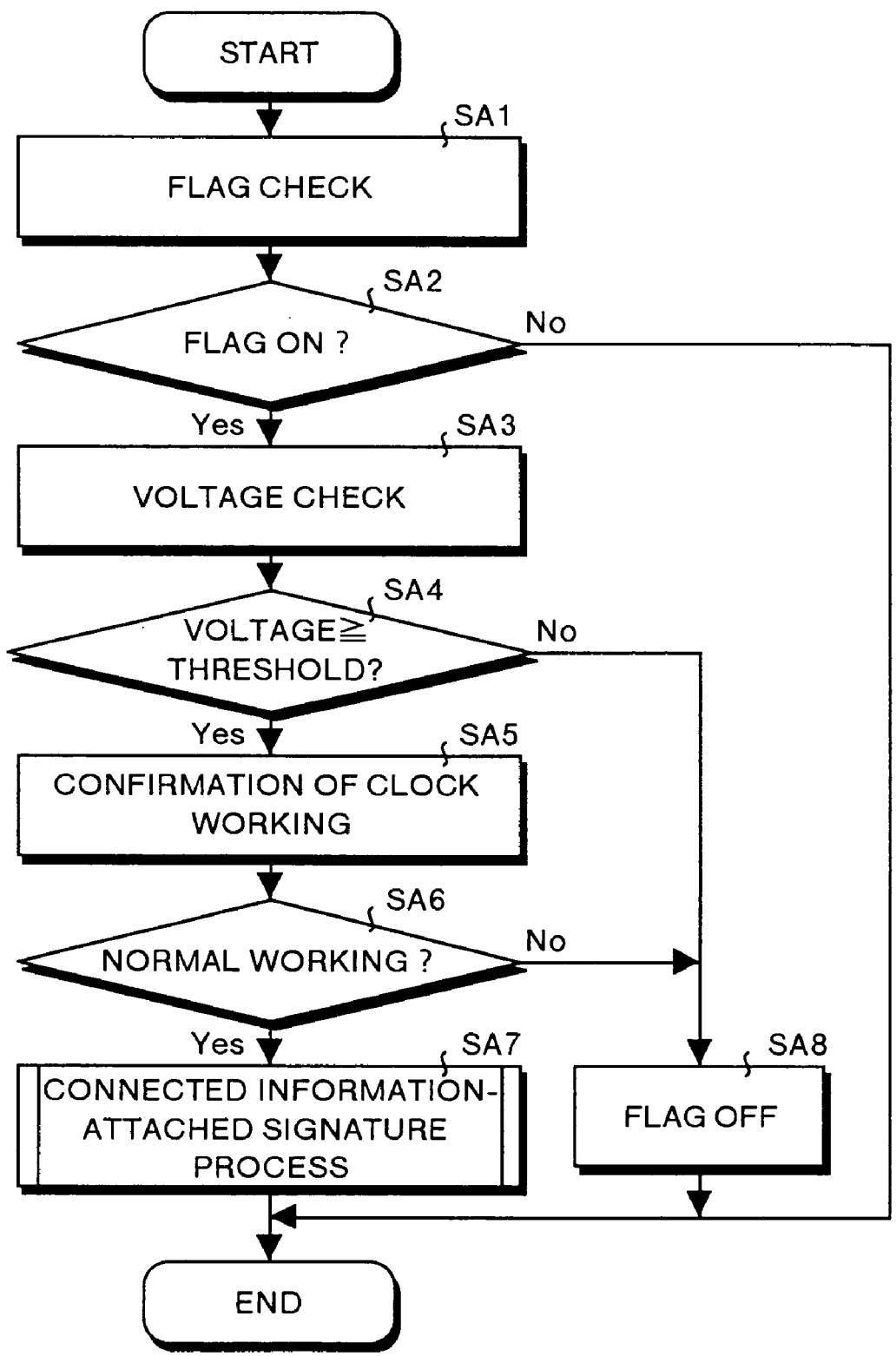
FIG. 5 is a flow chart showing an operation according to the first embodiment.

When the power supply of the signature creating apparatus 100 is turned ON, a processor, not shown, proceeds to step SA1 shown in FIG. 5 and checks a flag representing whether or not the clock 103 is in the usable state, and then the processor proceeds to step SA2. When the flag is ON, the clock 103 is in the usable state (a digital signature can be created), and when the flag is OFF, the clock 103 is in the unusable state (a digital signature cannot be created).

At step SA2, the processor judges as to whether or not the flag is ON. Here, when the flag is OFF, the processor judges that a digital signature cannot be created and processes the judged result at step SA2 as "No" so as to end the process. Meanwhile, when the judged result at step SA2 is "Yes", the processor proceeds to step SA3 and checks a voltage of the battery 104 so as to proceed to step SA4.

At step SA4, the processor judges as to whether or not the checked voltage is not less than a threshold. Here, the threshold is the lowest voltage which guarantees the normal working of the clock 103. When the judged result at step SA4 is "No", the processor judges that the clock 103 is in the unusable state, namely, in the state that normalness of the time stamp C is not guaranteed. Then, the processor proceeds to step SA8 and brings the flag into OFF state so as to end the process. Meanwhile, when the judged result at step SA4 is "Yes", the processor proceeds to step SA5 and confirms as to whether or not the clock 103 works so as to proceed to step SA6. Concretely, after obtaining the time counted result of the clock 103, the processor obtains the time counted result again after specified time passes, and compares both the time counted results so as to confirm as to whether or not the clock 103 works.

At step SA6, the processor judges based on the confirmed result at step SA5 as to whether or not the clock 103 works normally. Namely, when the time counted result obtained later is advanced to the time counted result obtained previously, the processor judges that the clock 103 works normally. On the other hand, when both the clock results are corresponding, the processor judges that the clock 103 is stopped. When the judged result at step SA6 is "No", the processor proceeds to step SA8 and brings the flag into OFF state so as to end the process. Meanwhile, when the judged result at step SA6 is "Yes", the processor proceeds to step SA7 so as to execute connected information-attached signature process.

The connected information is information (apparatus ID•B, time stamp C, personal identification information D) connected to the plain-text A as shown by (d) in FIG. 3. Moreover, the keys (signature creating key $K_{s1}$, signature creating key $K_{s1}'$, signature verification key $K_{s1}$", signature verification key $K_{c1}$, signature verification key $K_{c1}'$, signature creating key $K_{c1}$": see FIG. 2A and FIG. 2B) to be used in the connected information-attached signature process described below are only for the connected information-attached signature process. Therefore, these keys are different from the keys which are used for creation/verification of a digital signature in the plain-text A to which the connected information is not connected and for encryption/decoding of only the plain-text A.

There will be detailed below the connected information-attached signature process. At first, the description will be given as to the case where the signature creating apparatus 100 has the function as the lower apparatus 100A (see FIG. 2A), and the signature verification apparatus 500 has the function as the upper apparatus 100B (see FIG. 2B). When the plain-text A is inputted from the computer 200 into the connecting section 102, as shown in FIGS. 3(b) through 3(d), the apparatus ID•B, time stamp C and personal identification information D are added successively to the plaintext A by the connecting section 102, the connecting section 106 and the connecting section 109. The data E for the signature (see (d) in FIG. 3) are inputted into the signature creating circuit 112 and the connecting section 113.

Accordingly, as shown by (e) in FIG. 3, the data E for the signature is encrypted by the signature creating key $K_{s1}$ so that the signature L is created in the signature creating circuit 112, and as shown by (f) in FIG. 3, the signature L is connected to the data E for the signature so that the signed data M are created in the connecting section 113. The signed data M are transmitted to the network 300 by the computer 200 and are received by the computer 400 so as to be inputted into the separating section 501 of the signature verification apparatus 500. Then, the signed data M (see (a) in FIG. 4) are separated into the data E for the signature and the signature L by the separating section 501 as shown by (b) in FIG. 4.

Accordingly, as shown by (c) in FIG. 4, the separated data E for the signature are encrypted by the signature verification key $K_{s1}"$ generated by the signature verification key generating section 503 so that a signature N is created in the signature creating circuit 504. The comparison section 505 compares the separated signature L with the signature N created by the signature creating circuit 504 so as to verify as to whether or not the data E for the signature is interpolated. When both the signatures are corresponding, the comparison section 505 obtains the verified result that there is no interpolation, and when both of them are not corresponding, the comparison circuit 505 obtains the verified result that there is interpolation.

In the case where the signature creating apparatus 100 has the function as the upper apparatus 100B (see FIG. 2B) and the signature verification apparatus 500 has the function as the lower apparatus 100A (see FIG. 2A), instead of the signature creating key $K_{s1}$, a signature creating key $K_{c1}"$ generated by the signature creating key generating section 111 is used in the signature creating circuit 112 of the signature creating apparatus 100. Meanwhile, instead of the signature verification key $K_{s1}"$, a signature verification key $K_{c1}$ is used in the signature creating circuit 504 of the signature verification apparatus 500.

Incidentally, the above description referred to that the time of the clock 103 in the signature creating apparatus 100 can be set only by the computer 600 in the CA center which is the time authentication authority. The setting of the time of the clock 103 will be explained below with the reference to FIG. 6. In the case where the flag is in OFF state because the battery 104 is replaced or the battery 104 is charged, the time is set by the clock update section 105 of the signature creating apparatus 100. In this case, when a time set command is inputted from the computer 200, the clock update section 105 of the signature creating apparatus 100 accesses the computer 600 in the CA center via the computer 200 and network 300 so as to request the time setting at step SR1 shown in FIG. 6. As a result, the computer 600 requests the apparatus ID of the signature creating apparatus 100 at step SR2. The clock update section 105 which received this request transmits the apparatus ID to the computer 600 at step SR3.

At step SR4, the computer 600 transmits time setting information about accurate data and time. At this time, the computer 600 encrypts the time setting information using the private key of the signature creating apparatus 100 in the public key method so as to create a digital signature, and transmits the time setting information to which the digital signature is connected. When the time setting information with digital signature is received, the clock update section 105 verifies the digital signature using the public key. As a result of the verification, when there is no interpolation, the clock update section 105 corrects the clock 103 based on the time setting information at step SR5 so as to set accurate time. Thereafter, the clock update section 105 makes a response of the time setting to the computer 600. At the time of the response, a digital signature is created by using the private key of the signature creating apparatus 100 and the digital signature may be transmitted to the computer 600.

The computer 600 which received the response requests the time information of the clock 103 after the correction from the clock update section 105 at step SR6. The time update section 105 which received this request transmits the time information of the clock 103 to the computer 600 at step SR7. At this time, the clock update section 105 encrypts the time information using the private key of the signature creating apparatus 100 so as to create a digital signature, and transmits the time information to which the digital signature is connected. When receiving the time information with the digital signature, the computer 600 verifies the digital signature using the public key. As a result of this verification, when there is no interpolation, the completion of the time set is posted to the clock update section 105 by the computer 600 at step SR8. As a result, after the flag is brought from OFF state into ON state, a series of the time setting is completed in the signature creating apparatus 100.

The above description referred to the case where the computer 600 sets the time according to the request of the time setting from the side of the signature creating apparatus 100. However, it is also possible for the computer 600 to access the signature creating apparatus 100 (clock update section 105) periodically and to correct the clock 103 automatically. This operation will be detailed below with reference to FIG. 7. At step SQ1 shown in FIG. 7, the computer 600 accesses the clock update section 105 of the signature creating apparatus 100 via the network 300 and the computer 200, and requests the apparatus ID of the signature creating apparatus 100. The clock update section 105 which received this request transmits the apparatus ID to the computer 600 at step SQ2.

At step SQ3, the computer 600 requests current time information of the clock 103 to the clock update section 105. The clock update section 105 which received this request transmits the time information of the clock 103 to the computer 600 at step SQ4. At this time, the clock update section 105 encrypts the time information using the private key so as to create a digital signature, and transmits the time information to which the digital signature is connected. When receiving the time information with the digital signature, the computer 600 verifies the digital signature using the public key. As a result of this verification, when there is no interpolation, the computer 600 verifies as to whether or not an error of the time information exists based on a result of comparing with the accurate time information. When the error does not exists, no process is executed.

When the error exists, the computer 600 transmits time setting information about accurate date and time at step SQ5. At this time, the computer 600 encrypts the time setting information using the private key of the signature creating apparatus 100 so as to generate a digital signature, and transmits the time setting information to which the digital signature is connected. When receiving the time setting information with the digital signature, the clock update section 105 verifies the digital signature using the public key. As a result of this verification, there is no interpolation, when the clock update section 105 corrects the clock 103 based on the time setting information so as to set the time accurately, and makes a response of the time setting to the computer 600 at step SQ6. At the time of the response, a digital signature is created using the private key of the signature creating apparatus 100 and this digital signature may be transmitted to the computer 600.

The computer 600 which received the response requests the time information about the clock 103 after the correction from the clock update section 105 at step SQ7. At step SQ8, the clock update section 105 transmits the corrected time information to the computer 600. At this time, the clock update section 105 encrypts the time information using the private key so as to create a digital signature, and transmits the time information to which the digital signature is connected. When receiving the time information with the digital signature, the computer 600 verifies the digital signature using the public key. As a result of this verification, when there is no interpolation, the computer 600 posts the completion of the time setting to the clock update section 105 so that a series of automatic correction of the time information is completed at step SQ9. Thereafter, the computer 600 periodically accesses the clock update section 105 of the signature creating apparatus 100 so as to correct the clock 103 automatically. Such an automatic correction is made so that accuracy of the time information (time stamp C) of the clock 103 is maintained at high level.

The above-mentioned first embodiment described the example that the signature creating key $K_{s1}"$ is generated from signature verification key $K_{s1}'$ and the ID information of the lower apparatus by the signature verification key generating section 503 shown in FIG. 1. However, as shown by alternate long and two dashes line in FIG. 1, it is also available to generate the signature verification key $K_{s1}"$ from cryptographic information $C_r$ from the computer 600 installed in the CA center and peculiar key $K_r$ of the signature verification apparatus 500. Namely, in this case, in the computer 600, the signature verification key $K_{s1}"$ is encrypted by using the peculiar key $K_r$ of the signature verification apparatus 500 so that the cryptographic information $C_r$ is generated.

When the cryptographic information $C_r$ is transmitted from the computer 600, the cryptographic information $C_r$ is inputted into the signature verification key generating section 503 via the network 300 and computer 400. As a result, the signature verification key generating section 503 decodes the cryptographic information $C_r$ using the peculiar key $K_r$ so as to generate the signature verification key $K_{s1}"$. Hereinafter, similar to the above operation, the signature creating circuit 504 creates the signature N based on the signature verification key $K_{s1}"$. According to this constitution, the cryptographic information $C_r$ is received from the computer 600 installed in the CA center having high reliability and the cryptographic information $C_r$ is decoded so that the signature verification key $K_{s1}"$ is generated. Therefore, the security in the signature verification apparatus 500 can be much heightened.

In addition, in the above-mentioned first embodiment, three pieces of information such as the apparatus ID•B, time stamp C and personal identification information D are examples of the elements which compose the connected information However, the present invention is not limited to them. Namely, as the connected information, only one piece of information or a combination of at least two pieces of information may be used. For example, the following (a) through (d) are examples of the connected information:

(a) the connected information composed of the apparatus ID•B and time stamp C;

(b) the connected information composed of only the apparatus ID•B;

(c) the connected information composed of only the time stamp C; and (d) the connected information composed of the apparatus ID•B and personal identification information D.

In (a) through (d), the connected information (a) and the connected information (c) include the time stamp C, whereas the connected information (b) and the connected information (d) do not include the time stamp C. In the case where a signature is created based on the plain-text A to which the connected information (a) through (d) is connected, four kinds of keys for creating a signature corresponding to the respective connected information may be used in the signature creating circuit 112. These four kinds of keys are also possible to be stored in the key storage section 110. Further, they are possible to be created by the signature creating key generating section 111.

In relation to this, as described with reference to FIG. 5 in the above first embodiment, in the case where the voltage of the battery 104 is lower than the threshold or the clock 103 does not work normally, namely, in the case where the time stamp C (time information) from the clock 103 cannot be used, the connected information-attached signature process is not executed. However, in this case, the using of the keys for the connected information (a) or (c) including the time stamp C is stopped by controlling the processor, and the keys for the connected information (b) or (d) which are not including the time stamp C are used so that the signature may be created based on the connected information (b) or (d).

As mentioned above, according to the first embodiment, the time information of the clock 103 can be set only by the computer 600 in the CA center, and the digital signature is added to the plain-text A to which the connected information (apparatus ID•B, time stamp C and personal identification information D) is connected, and the key which is only for signature with the connected information is used so that the digital signature is added. As a result, the date and time can be prevented from being interpolated, and a person or an apparatus who (which) gave the digital signature can be specified so that the implementor can be specified easily. Moreover, according to the first embodiment, since the personal identification information D can be changed easily by the personal identification information update section 108, it is possible to deal also with the change in organization of an office flexibly.

Figure 8:
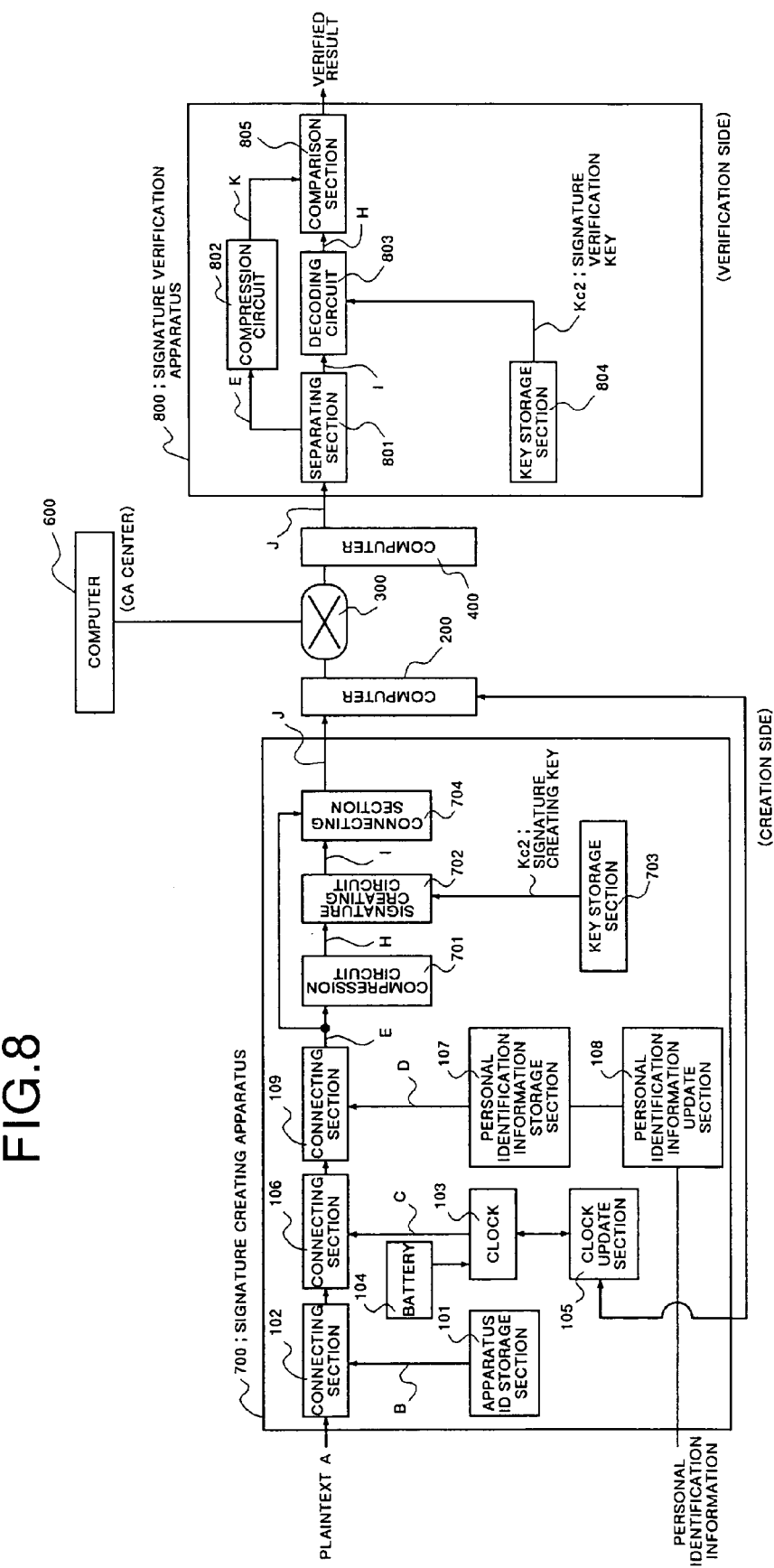
FIG. 8 is a block diagram showing a structure according to a second embodiment of the present invention.

FIG. 8 is a block diagram showing a structure according to a second embodiment of the present invention. In this drawing, the same reference numerals are given to the parts corresponding to those in FIG. 1, and the description thereof is omitted. FIG. 8 shows a signature creating apparatus 700 for creating a digital signature using the public key method instead of the common key method in the first embodiment and a signature verification apparatus 800 for making verification based on the created digital signature. Since the signature creating apparatus 700 creates/verifies a digital signature according to the public key method, a signature creating key $K_{s2}$ which is a private key of an implementor (signature creating apparatus 700) is used. On the other hand, in the signature verification apparatus 800, a signature verification key $K_{c2}$ which is the public key of the implementor (signature creating apparatus 700) is used. The signature creating key $K_{s2}$ and the signature verification key $K_{c2}$ are only for creation and verification of a connected information-attached signature similarly to the case of the first embodiment, and they cannot be used for another purpose.

Similarly to the signature creating apparatus 100 (see FIG. 1), the signature creating apparatus 700 of a card type is inserted into the card slot of the computer 200 and is connected therewith. The signature creating apparatus 700 creates a signature (digital signature) I (see (g) in FIG. 9) with respect to the connected information (apparatus ID•B, time stamp C and personal identification information D (see (b), (c) and (d) in FIG. 9) connected to the plain-text A (see (a) in FIG. 9). In the signature creating apparatus 700, a compression circuit 701, a signature creating circuit 702, a key storage section 703 and a connecting section 704 are provided instead of the key storage section 110, the signature creating key generating section 111, the signature creating circuit 112 and the connecting section 113 shown in FIG. 1.

Figure 9:
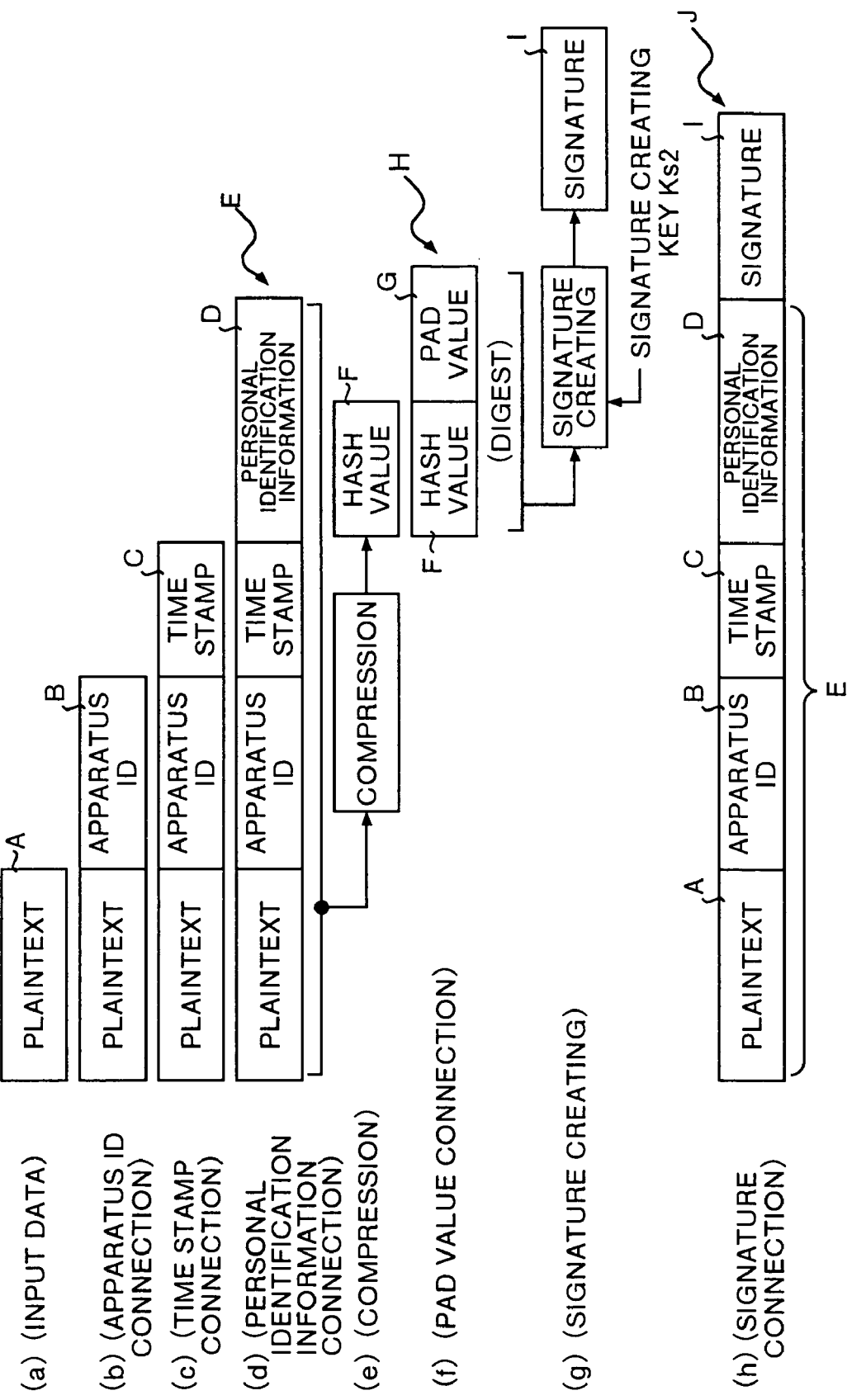
FIG. 9 is a diagram showing data transition in the second embodiment.

A signature creating key $K_{s2}$ is stored in the key storage section 703, and the compression circuit 701 connects a Pad value G (see (f) in FIG. 9) composed of bit strings to a hash value F (see (e) in FIG. 9), which is obtained by compressing the data E for the signature (see (d) in FIG. 9) inputted from the connecting section 109 according to a hash function, so as to create a digest H. The digest H is composed of fixed length bit strings. As shown by (g) in FIG. 9, the signature creating circuit 702 encrypts the digest H using the signature creating key $K_{s2}$ so as to create a signature (digital signature) I. As shown by (h) in FIG. 9, the connecting section 704 connects the data E for the signature from the connecting section 109 to the signature I created by the signature creating circuit 702 so as to transmit it as signed data J to the computer 200.

Meanwhile, the signature verification apparatus 800 of a card type is inserted into the card slot of the computer 400 and is connected therewith similarly to the signature verification apparatus 500 (see FIG. 1). The signature verification apparatus 800 verifies the signature I based on the signed data J (see (a) in FIG. 10) received by the computer 400. In the signature verification apparatus 800, as shown by (b) in FIG. 10, a separating section 801 separates the signed data J into the data E for the signature and the signature I. A compression circuit 802 has the function similar to that of the compression circuit 701 of the signature creating apparatus 700.

Figure 10:
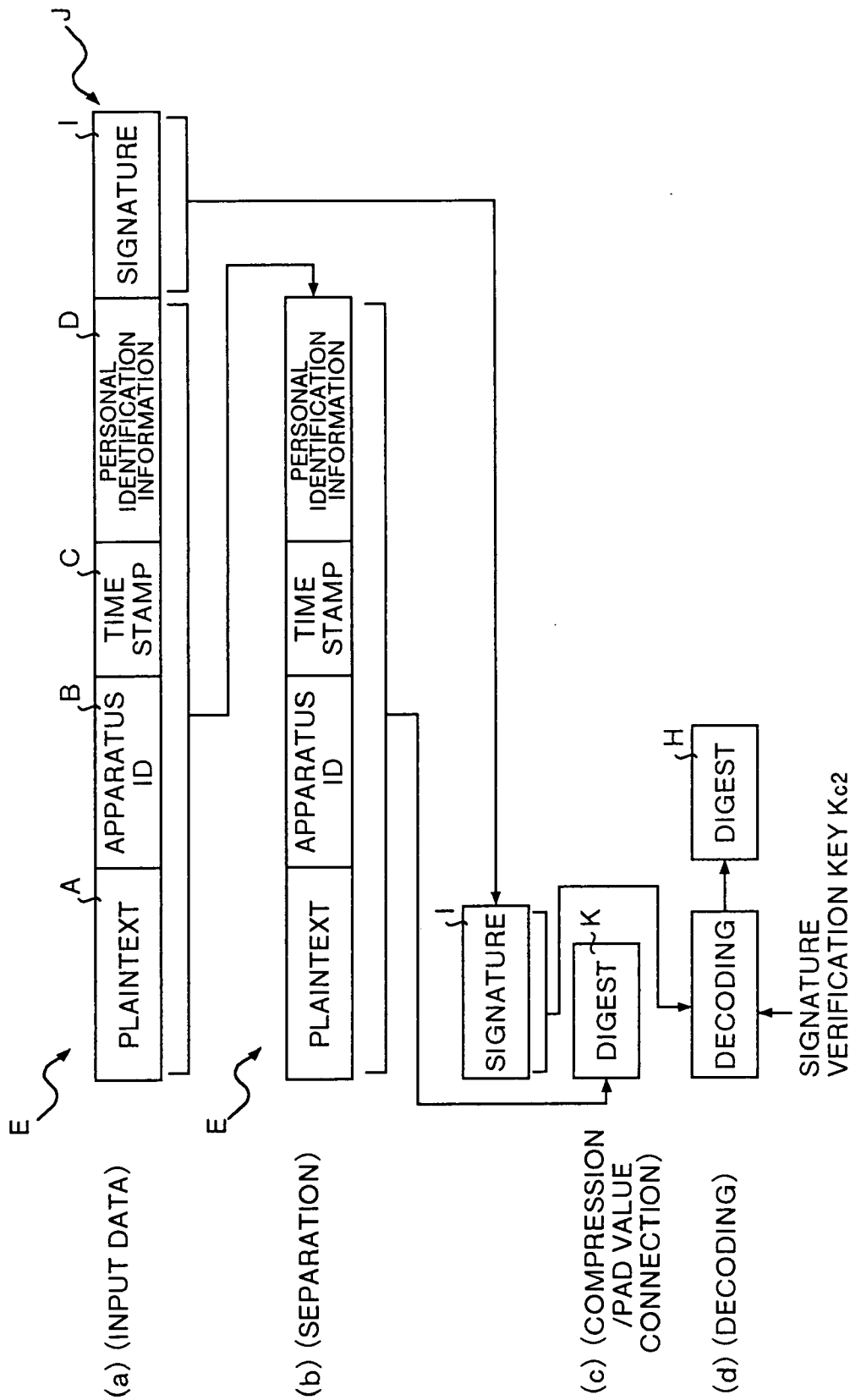
FIG. 10 is a diagram showing data transition in the second embodiment.

Namely, the compression circuit 802 connects the Pad value to the result (hash value) obtained by compressing the data E for the signature using the same hash function used in the compression circuit 701 so as to create a digest K shown by (c) in FIG. 10. A decoding circuit 803 decodes the signature I using the signature verification key $K_{c2}$ stored in the key storage section 804 as shown by (d) in FIG. 10 so as to create a digest H. A comparison section 805 compares the digest K with the digest H so as to verify as to whether or not the data E for the signature are interpolated. Namely, when the digest K is corresponding to the digest H, the comparison circuit 805 obtains the verified result that there is no interpolation, and when both the digests are not corresponding, the comparison circuit 805 obtained the verified result that there is interpolation.

There will be described below the operation according to the second embodiment. Here, since the basic operation in the second embodiment is similar to steps SA1 through SA6 and step SA8 shown in FIG. 5, steps SR1 through SR8 shown in FIG. 6 and steps SQ1 through SQ9 shown in FIG. 7, the description thereof is omitted. Therefore, there will be described below a connected information-attached signature process at step SA7 in the second embodiment.

In this connected information-attached signature process, when the plain-text A is inputted from the computer 200 into the connecting section 102 of the signature creating apparatus 700, as shown in FIGS. 9(b) through 9(d), the apparatus ID•B, the time stamp C and the personal identification information D are connected successively to the plain-text A by the connecting section 102, the connecting section 106 and the connecting section 109. Then, the data E for the signature (see (d) in FIG. 9) are inputted into the compression circuit 701 and the connecting section 704.

As a result, in the compression circuit 701, the Pad value G is connected to the hash value F (see (e) in FIG. 9), which was obtained by compressing the data E for the signature using the hash function, and the digest H (see (f) in FIG. 9) is created. In the signature creating circuit 702, as shown by (g) in FIG. 9, the digest H is encrypted by the signature creating key $K_{s2}$ so that the signature I is created. In the connecting section 704, as shown by (h) in FIG. 9, the signature I is connected to the data E for the signature so that the signed data J are created. After the signed data J are transmitted to the network 300 by the computer 200 and are received by the computer 400, the signed data J are inputted into the separating section 801 of the signature verification apparatus 800. As shown by (b) in FIG. 10, the signed data J (see (a) in FIG. 10) are separated into the data E for the signature and the signature I by the separating section 801.

Accordingly, in the compression circuit 802, as shown by (c) in FIG. 10, the digest K is created from the data E for the signature based on the hash function. Meanwhile, in the decoding circuit 803, as shown by (d) in FIG. 10, the separated signature I is decoded by the signature verification key $K_{c2}$ so that the digest H is created. The comparison section 805 compares the digest K with the digest H, and when they are corresponding, the comparison section 805 obtains the verified result that there is no interpolation. When they are not corresponding, the comparison circuit 805 obtains the verified result that there is interpolation.

As described above, according to the second embodiment, similarly to the first embodiment, date and time can be prevented from being interpolated, and a person and an apparatus who (which) made the digital signature can be specified so that the implementor can be specified easily. Further, according to the second embodiment, since the personal identification information D can be changed easily by the personal identification information update section 108, it is possible to deal also with the change in organization of an office flexibly.

The aforementioned first and second embodiments described the example that the signature creating apparatus and the signature verification apparatus are provided separately. However, it is also possible to provide a signature apparatus which has both the signature creating function and the signature verification function in the creating side and the verification side respectively. In this case, in the signature apparatus on the creating side, the signature creating function is selected, and in the signature apparatus on the verification side, the signature verification function is selected. This case will be described below as a third embodiment.

Figure 11:
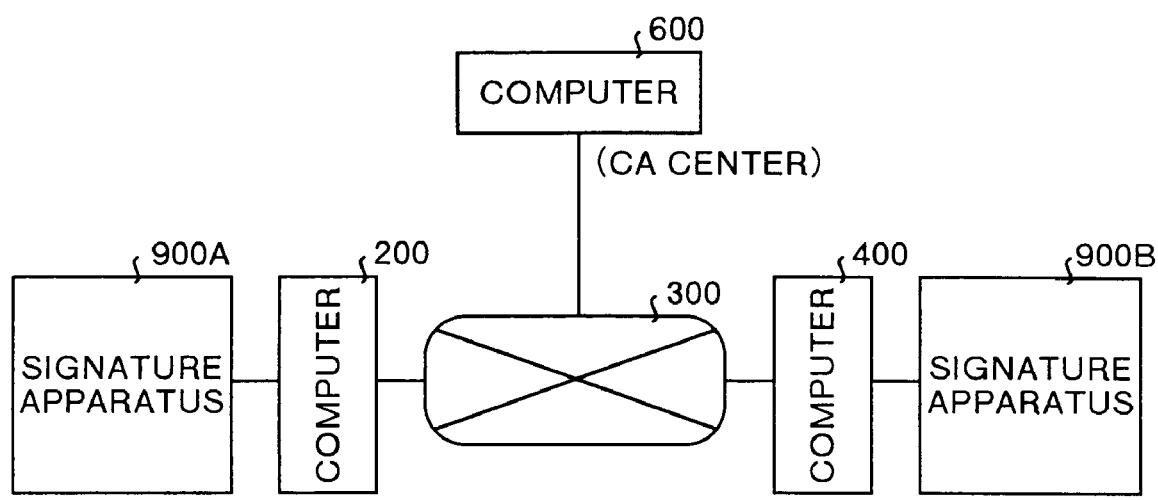
FIG. 11 is a block diagram showing a structure according to a third embodiment of the present invention.

FIG. 11 is a block diagram showing a structure according to the third embodiment of the present invention. In this drawing, the same reference numerals are given to the parts corresponding to the parts in FIGS. 1 and 8. In this drawing, a signature apparatus 900A has the encryption/decoding function as well as the signature creation/verification function, and is connected with the computer 200. In the signature apparatus 900A, the signature creation/verification function is similar to the function of the signature creating apparatus 100 and the signature verification apparatus 500 shown in FIG. 1 and the function of the signature creating apparatus 700 and the signature verification apparatus 800 shown in FIG. 8. A signature apparatus 900B has the function which is identical to that of the signature apparatus 900A, and is connected with the computer 400. Here, the signature apparatus 900A and the signature apparatus 900B are of a card type, and are inserted into the card slots of the computer 200 and the computer 400 respectively and are connected therewith.

Figure 12:
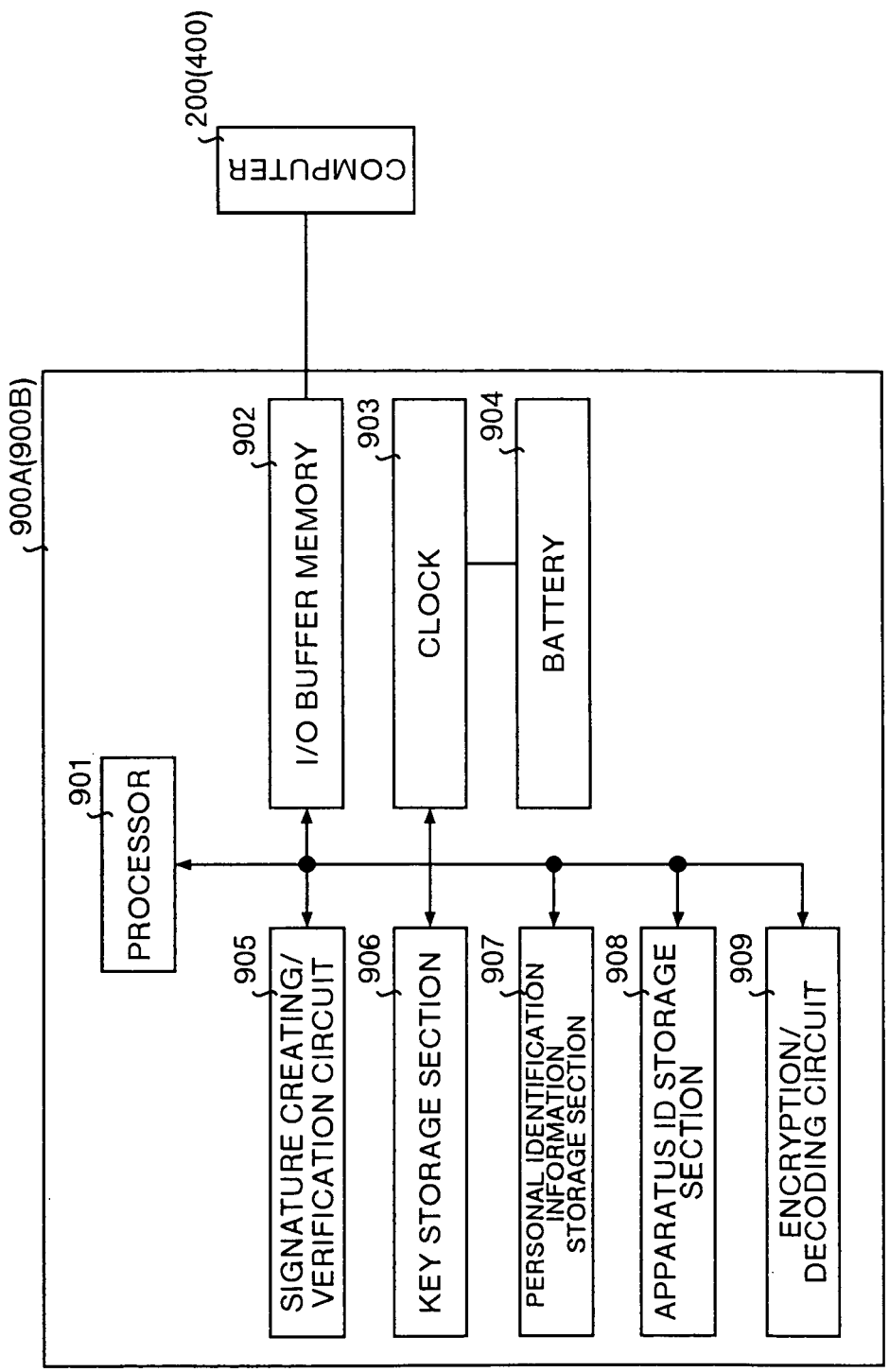
FIG. 12 is a block diagram showing a structure of a signature apparatus 900A (900B) shown in FIG. 11.

A structure of the signature apparatus 900A will be explained below with reference to FIG. 12. In this drawing, a processor 901 controls respective sections of the apparatus, and has the functions which are the same as those of the clock update section 105, the personal identification information update section 108, the signature creating key generating section 111 and the signature verification key generating section 503 shown in FIG. 1. The details about the operation of the processor 901 will be described later with reference to the flow chart. An I/O buffer memory 902 temporarily stores data inputted/outputted into/from the computer 200. A clock 903 is driven by a battery 904 so as to generate time information similarly to the clock 103 shown in FIG. 1. Similarly to the embodiments 1 and 2, the time of the clock 903 can be set only by the computer 600 (see FIG. 11). The battery 904 is a primary battery or a chargeable secondary battery.

A signature creating/verification circuit 905 has the signature creating/verification function using the common key method or the public key method in the first or second embodiments. Concretely, the signature creating/verification circuit 905 has the function of the signature creating apparatus 100 and the signature verification apparatus 500 shown in FIG. 1 and the function of the signature creating apparatus 700 and the signature verification apparatus 800 shown in FIG. 8. A key storage section 906 stores the signature creating keys and the signature verification keys (common key, public key, private key) to be used in the signature creating/verification circuit 905. These signature creating keys and the signature verification keys are similar to those described in the first and second embodiments.

The signature creating keys and the signature verification keys are only for aforementioned connected information-attached signature process However, besides the keys for the exclusive use, a key for the signature creating/verification process which is executed only on the plain-text A (see (a) in FIG. 3) to which the connected information is not connected (hereinafter, referred to as plain-text signature process) is stored in the key storage section 906. Further, a cryptographic key and decoding key which are used in an encryption/decoding circuit 909, mentioned later, are stored in the key storage section 906. Namely, the signature apparatus 900A can execute three processes such as the connected information-attached signature process, the plain-text signature process and the encryption/decoding process.

A personal identification information storage section 907 stores personal identification information similarly to the personal identification information storage section 107 (see FIG. 1). An apparatus ID storage section 908 stores an apparatus ID for specifying the signature apparatus 900A similarly to the apparatus ID storage section 101 (see FIG. 1). The encryption/decoding circuit 909 executes the encryption/decoding process using the cryptographic key/decoding key stored in the key storage section 906. Here, the structure of the signature apparatus 900B is similar to the above-mentioned structure of the signature apparatus 900A.

However, in the signature apparatus 900B, an apparatus ID for specifying the signature apparatus 900B is stored in the apparatus ID storage section 908.

Figure 13:
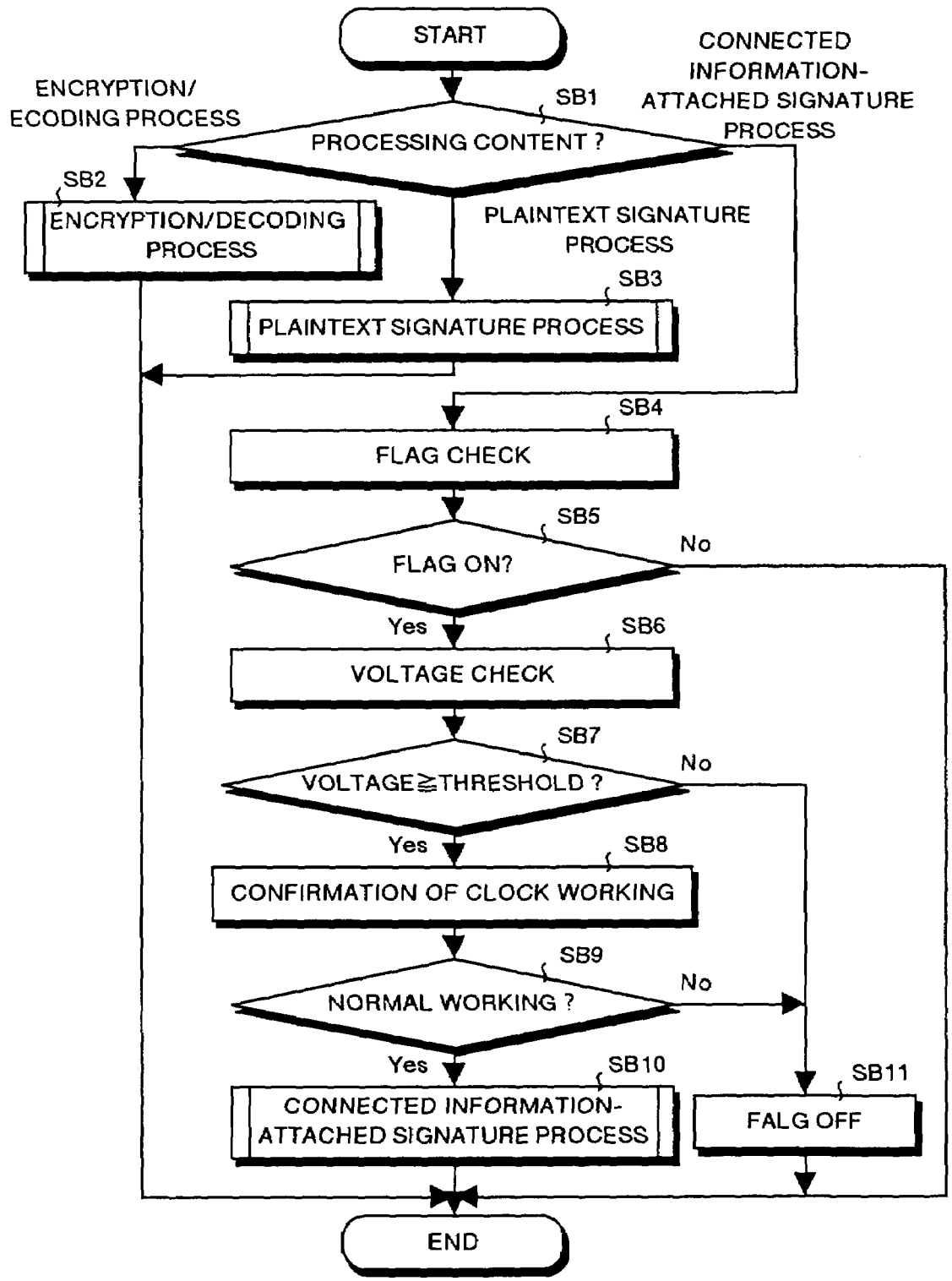
FIG. 13 is a flow chart showing an operation of the third embodiment.

There will be described below the operation according to the third embodiment with reference to a flow chart shown in FIG. 13. In this case, the signature apparatus 900A shown in FIG. 11 is used for the signature creating function, and the signature apparatus 900B is used for the signature verification. At step SB1 shown in FIG. 13, the processor 901 of the signature apparatus 900A selects one of the connected information-attached signature process, the plain-text signature process and the encryption/decoding process based on an input of a command from the computer 200. In this case, when the connected information-attached signature process is selected, the processor 901 proceeds to step SB4. When the plain-text signature process is selected, the processor 901 proceeds to step SB3 and controls the signature creating/verification circuit 905 so as to execute the plain-text signature process for creating a signature for the plain-text (see (a) in FIG. 3) inputted from the computer 200. Further, when the encryption/decoding process is selected, the processor 901 proceeds to step SB2 and controls the encryption/decoding circuit 909 so as to execute the encryption/decoding process.

At step SB4, similarly to the first embodiment, after the processor 901 checks the flag which represents as to whether or not the clock 903 is in the usable state, the processor 901 proceeds to step SB5. When this flag is ON, the clock 903 in the usable state (a digital signature can be created), and when the flag is OFF, the clock 903 is the unusable state (a digital signature cannot be created).

At step SB5, the processor 901 judges as to whether or not the flag is ON. When the flag is OFF, the processor 901 judges that a digital signature cannot be created and decides the judged result at step SB5 as "No" so as to end the process. Meanwhile, when the judged result at step SB5 is "Yes", the processor 901 proceeds to step SB6 so as to check the voltage of the battery 904, and proceeds to step SB7.

At step SB7, the processor 901 judges as to whether or not the checked voltage obtains not less than a threshold. When the judged result is "No", the processor 901 proceeds to step SB11 so as to bring the flag into OFF state, and ends the process. Meanwhile, when the judged result at step SB7 is "Yes", the processor 901 proceeds to step SB8 so as to check as to whether or not the clock 903 works, and proceeds to step SB9. At step SB9, the processor 901 judges as to whether or not the clock 903 works normally based on the checked result at step SB8. When the judged result is "No", the processor 901 proceeds to step SB11 so as to bring the flag into OFF state, and ends the process. Meanwhile, the judged result at step SB9 is "Yes", the processor 901 proceeds to step SB10 so as to execute the connected information-attached signature process shown in FIG. 14.

In the connected information-attached signature process shown in FIG. 14, at step SC1, the computer 200 (implementor) sets a key to be used in the signature process in the signature apparatus 900A according to an input of a command. In this case, since the signature apparatus 900A is used as the apparatus having the signature creating function, the computer 200 sets the key for the signature creation in the signature creating/verification circuit 905 and the key storage section 906 of the signature apparatus 900A. Therefore, in this case, the signature creating/verification circuit 905 is used as the signature creating circuit.

At step SC2, the computer 200 starts to input data (plain-text A (see (a) in FIG. 3)) for the signature into the signature apparatus 900A, and proceeds to step SC3. In the case where an amount of the data is very large, the data are divided into plural parts so as to be inputted dividedly. At step SC3, the computer 200 judges as to whether or not the input of the data is completed, and when the judged result is "No", the computer 200 returns to step SC2. When the input of the data is completed, the computer 200 obtains the judged result at step SC3 as "Yes" and proceeds to step SC4. At step SC4, the computer 200 selects the function of the signature apparatus 900A (signature creating function or signature verification function).

In this case, when the signature creating function is selected, the computer 200 inputs a signature creating command at step SC5. When the signature creating command is inputted into the processor 901 of the signature apparatus 900A, the processor 901 executes the connected information-attached signature creating process similarly to the signature creating apparatus 100 (or signature creating apparatus 700) in the first embodiment (or second embodiment). As a result, the signed data M (see (f) in FIG. 3) (or signed data J (see (h) in FIG. 9) are transmitted from the signature apparatus 900A shown in FIG. 11 to the computer 400 via the network 300.

When the signed data M (or signed data J) are received, the computer 400 sets a key at step SC1 shown in FIG. 14. In this case, since the signature apparatus 900B is used as the apparatus having the signature verification function, the computer 400 sets the signature verification key in the signature creating/verification circuit 905 and the key storage section 906 of the signature apparatus 900B. Therefore, in this case, the signature creating/verification circuit 905 is used as the signature verification circuit.

At step SC2, the computer 400 starts to input the data (signed data M or signed data J) to be verified into the signature apparatus 900B, and proceeds to step SC3. At step SC3, the computer 400 judges as to whether or not the input of the data is completed, and when the judged result is "No", the computer 400 returns to step SC2. When the input of the data is completed, the computer 400 obtains the judged result at step SC3 as "Yes" and proceeds to step SC4. At step SC4, the computer 400 selects the function of the signature apparatus 900B (signature creating function or signature verification function). In this case, when the signature verification function is selected, the computer 400 inputs the signature verification command at step SC5.

When the signature verification command is inputted into the processor 901 of the signature apparatus 900B, the processor 901 executes the connected information-attached verification process similarly to the signature verification apparatus 500 (or the signature verification apparatus 800) in the first embodiment (or second embodiment). In the signature apparatus 900B, at step SB3 shown in FIG. 13, the data, where the signature was added to the plain-text in the signature apparatus 900A, are verified, and the data which were encrypted in the signature apparatus 900A are decoded at step SB2.

As described above, according to the third embodiment, since one process is selected from the connected information-attached signature process, the plain-text signature process and the encryption/decoding process so as to be executed by the signature apparatus 900A and the signature apparatus 900B, generality is improved. In particular, in the third embodiment, when the clock 903 malfunctions, the plain-text signature process can be executed instead of the connected information-attached signature process. Further, according to the third embodiment, the commands (signature creating command, signature verification command) are inputted from the computer 200 and computer 400 so that the function of the signature apparatus 900A and the signature apparatus 900B can be selected. Therefore, generality can be improved and the common portions (see FIG. 14) exist in the interface. As a result, the size of a firmware can be smaller than the cases of the first and second embodiments.

The first through third embodiments 1 through 3 were described with reference to the drawings, but the concrete constitutional example is not limited to the above embodiments and the design can be varied without being regarded as a departure from the spirit and scope of the invention. For example, as shown in FIG. 1, the first embodiment described the example that the one signature creating apparatus 100 is provided to the creating side and the one signature verification apparatus 500 is provided to the verification side, that is an example of composition ratio 1:1. However, it is also possible to provide n signature creating apparatuses 100 to the creating side for one signature verification apparatus 500 is provided to the verification side, that is a composition of ratio n:1.

In this composition, occasionally in the n signature creating apparatuses 100, unique common keys (signature creating keys) or one common key (signature creating key) are/is used in common. In the case where the unique common keys are used on the creating side, it is necessary to use n common keys (signature verification keys) in the signature verification apparatus 500, but the security is improved. Meanwhile, in the case where the one common key (signature creating key) is used in common on the creating side, since only one common key (signature verification key) may be used in the signature verification apparatus 500, the management of the key becomes easy.

Figure 6:
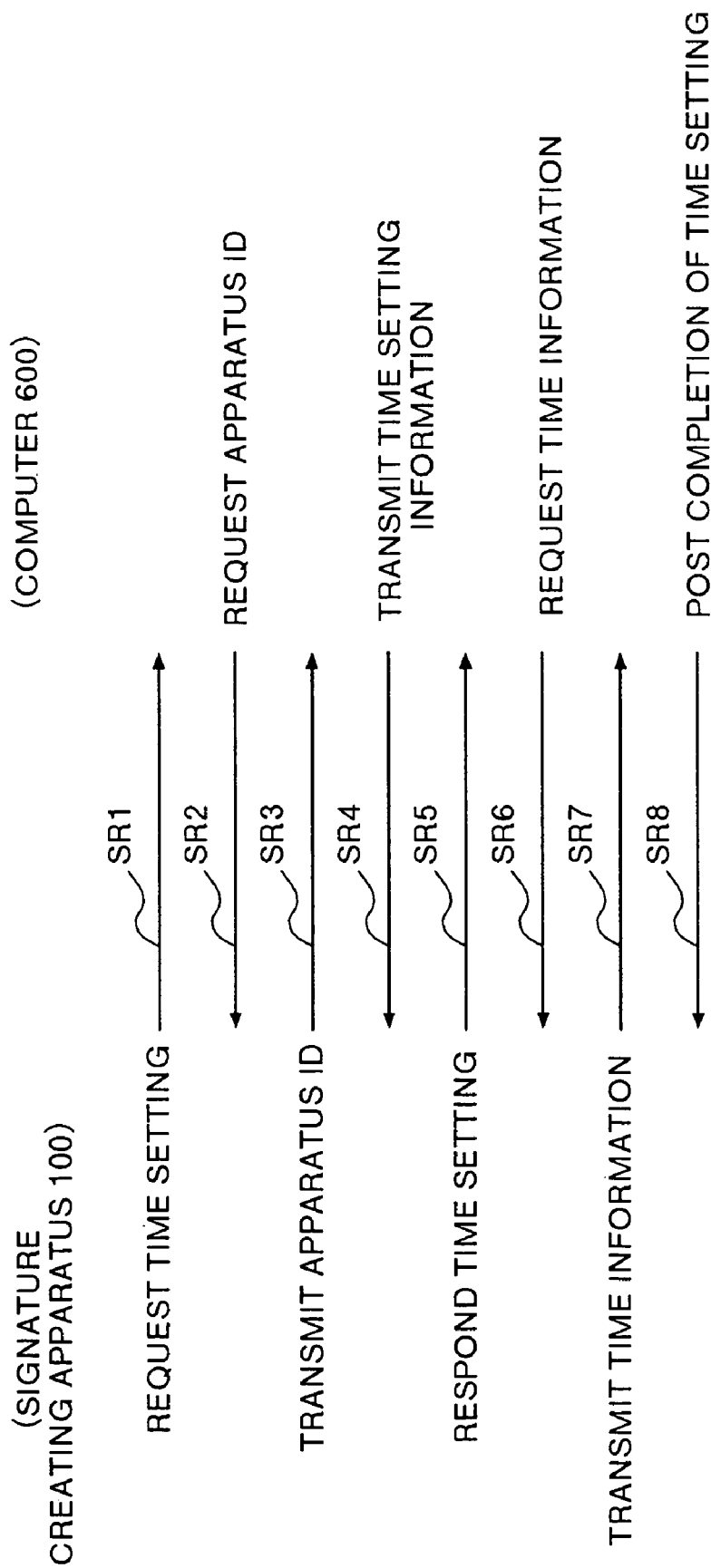
FIG. 6 is a diagram showing a time set sequence according to the first embodiment.
Figure 7:
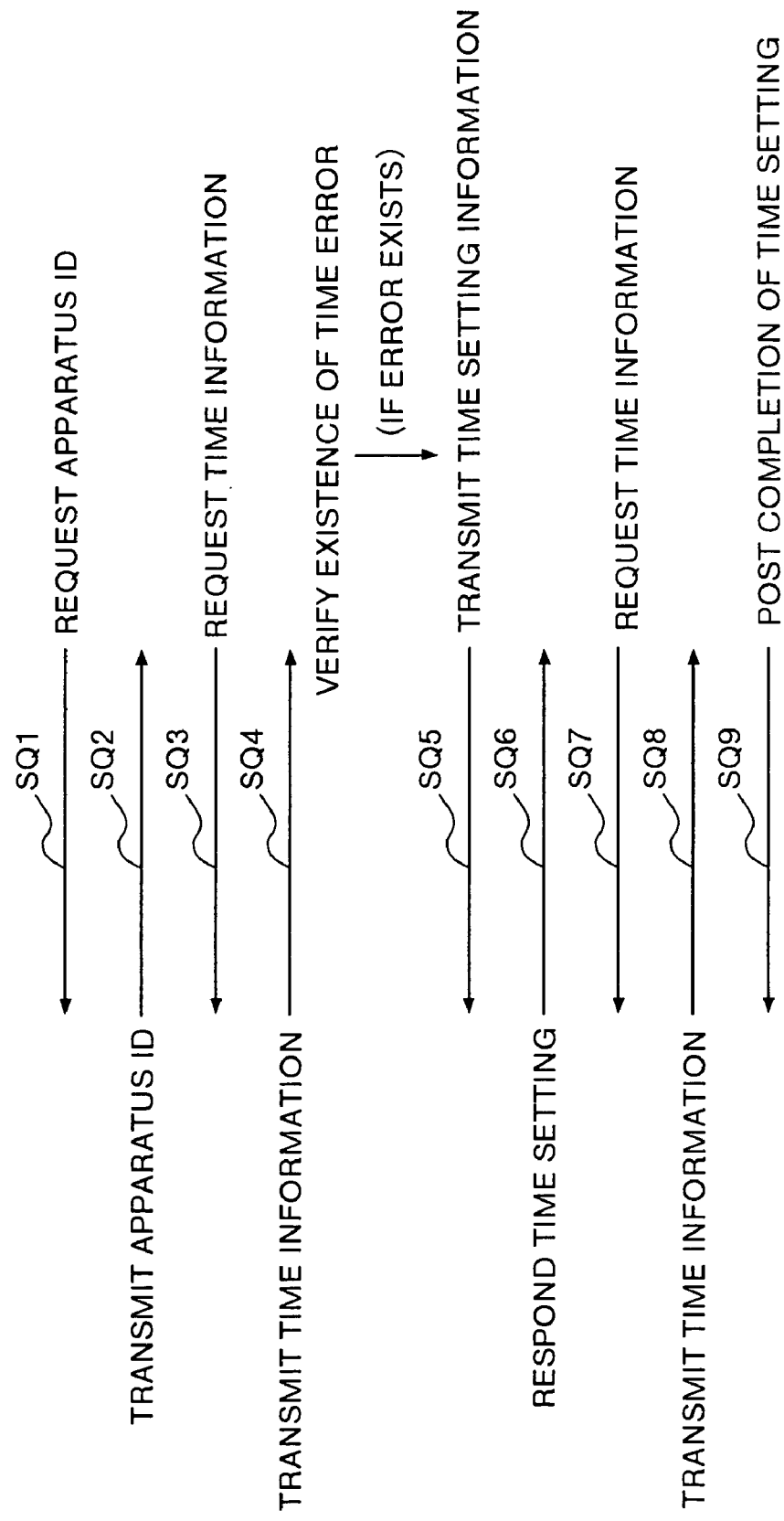
FIG. 7 is a diagram showing the time set sequence according to the first embodiment.

In addition, in the first embodiment, as described with reference to FIGS. 6 and 7, when the information about the time setting is transmitted/received between the signature creating apparatus 100 and the computer 600, the digital signature is made by using the public key method, but the digital signature may be made by using the common key method. In relation to this time setting, in the case where the n-numbered signature creating apparatuses 100 are provided, private keys (or common keys) which are different for the respective apparatuses may be used. In this case, it is possible to use a private key (or common key) in common in the apparatuses.

In addition, in the third embodiment, the signature may be created/verified by the one apparatus (signature apparatus 900A). In this case, before a verified result is obtained by the processor 901 of the signature apparatus 900A, only when the apparatus ID obtained from the signed data M (or signed data J) is compared with the apparatus ID stored in the apparatus storage section 908 of the signature apparatus 900A and both the IDs are corresponding, the signed data M (or signed data J) may be verified. In the case where both the IDs are not corresponding, it means that the signed data M (or signed data J) are created by an apparatus other than the signature apparatus 900A. Finally, a constitution which is obtained by combining two or three constitutions in the first through third embodiments is also included in the present invention.

As described above, according to one aspect of this invention the time information of the clock is set only by the time authentication authority and the digital signature is created by the connection data including the time information and the apparatus ID and by the keys only for signature. Therefore, interpolation of the date and time can be prevented, and the apparatus which has created the digital signature can be specified.

Further, the connection data including personal identification information are used so that the digital signature is created. Therefore, an implementor of the digital signature can be specified easily in the verification side, and the invention can deal with a change in the information about the implementor flexibly.

Further, by providing the judging unit, a third party who updates the personal identification information illegally can be eliminated. Therefore, the security is improved.

Further, the apparatus ID is stored in the storage unit which is unrewritable (for example, one-time ROM). Therefore, interpolation of the apparatus ID can be prevented, and the security is further improved.

Further, only in the case where it is confirmed by confirming unit that the clock works normally, the signature creating unit creates the digital signature. Therefore, the reliability of the time information is maintained at high level.

Further, in the case where the clock do not work normally due to malfunction or the like, namely, in the case where the digital signature cannot be created based on the connection data including the time information, the using of the keys only for signature creating is stopped, and the digital signature can be created by using the connected information not including the time information and the keys other than the keys only for signature creating. Therefore, generality is improved.

Further, in the compared result of the driving voltage and the threshold, in the case, for example, where the driving voltage of the clock is lower than the threshold, the confirming unit confirms that the clock does not work normally. Therefore, the reliability of the time information is maintained at high level.

Further, in a compared result of a time-counted result before a certain time and a time-counted result at the current time, in the case, for example, where both the time-counted results are corresponding, the confirming unit confirms that the clock stops. Therefore, the reliability of the time information is maintained at high level.

Further, only in the case where the flag is brought into ON state by the confirming unit, namely, only in the case where the clock works normally, the signature creating unit creates the digital signature. Therefore, the digital signature where the time information has high reliability is created.

Further, the setting unit which is installed in the time authentication authority sets time of the clock according to the time setting request. Therefore, a third party is efficiently prevented from interpolating the time illegally.

Further, the correcting unit corrects the clock automatically. Therefore, the accuracy of the time information obtained from the clock can be maintained at high level.

In addition, according to another aspect of this invention, the digital signature is created by using the connection data including the apparatus ID for specifying the creating apparatus and the keys only for signature, in the common key method. Therefore, the apparatus which has created the digital signature can be specified in the verification side.

In addition, according to still another aspect of this invention, the digital signature is verified based on the connection data including the authorized time information and the apparatus ID. Therefore, interpolation of the date and time can be prevented, and the apparatus which has created the digital signature can be specified.

Further, cryptographic information is provided by an high-reliable authority such as the key authentication authority, and the cryptographic information is decoded by the signature verification key generating unit so that the keys only for signature verification are generated. Therefore, the security in the apparatus can be heightened extremely.

In addition, according to still another aspect of this invention, when the signature creating function is brought into an effective state by the function selecting unit, the apparatus serves as the signature creating apparatus, and when the signature verification function is brought into an effective state by the function selecting unit, the apparatus serves as the signature verification apparatus. Therefore, generality can be improved.

Further, even in the case where a plurality of lower apparatuses exist, apparatus IDs of the lower apparatuses are managed by the upper apparatus. Therefore, strict management is not required unlike the case where the common keys of the plural lower apparatuses are managed.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A signature creating apparatus which creates and connects a digital signature, said signature creating apparatus comprising:

a clock in which time information is set only by an external time authentication authority;

an ID storing unit which stores an apparatus ID for specifying the creating apparatus using a form capable of preventing interpolation;

a personal identification storing unit which stores personal identification information for specifying a person who has a proper right to update stored contents;

a first connecting unit which creates connection data by connecting plain-text, the time information, the apparatus ID, and the personal identification information that identifies a person using the creating apparatus in a predetermined order;

a signature creating unit which creates the digital signature using the connection data created by said first connecting unit and a key used only for creating a digital signature;

a second connecting unit which creates signed data by connecting the digital signature with the connection data, and a confirming unit which confirms a working state of said clock, wherein the personal identification information is stored within the signature creating apparatus using a form capable of preventing interpolation, the signature creating unit encrypts the connection data to create the digital signature, the second connecting unit outputs the signal data to be transmitted to an external network, said signature creating unit creates the digital signature only when said confirming unit confirms that said clock works normally, stops using the key used only for creating the signature when said confirming unit confirms that said clock does not work normally, and creates an alternate digital signature using connected information which does not include the time information and using a key other than the key used only for creating the signature.

2. The signature creating apparatus according to claim 1, further comprising:

a storage unit which stores the personal identification information;

a judging unit which judges as to whether or not a person who updates stored contents of said storage unit is a person who has proper right; and an updating unit which updates the stored contents of said storage unit only when said judging unit has judged that the person who updates is the person who has proper right.

3. The signature creating apparatus according to claim 1, further comprising an unrewritable storage unit in which the apparatus ID is stored.

4. The signature creating apparatus according to claim 1, further comprising a setting unit which sets the time information according to a time setting request, said setting unit being installed in the time authentication authority.

5. The signature creating apparatus according to claim 1, further comprising a correcting unit which corrects said clock automatically, said correcting unit being installed in the time authentication authority.

6. A signature creating apparatus which creates and connects a digital signature using a common key method, said signature creating apparatus comprising:

an ID storing unit which stores an apparatus ID for specifying the creating apparatus using a form capable of preventing interpolation;

a personal identification storing unit which stores personal identification information for specifying a person who has a proper right to update stored contents;

a first connecting unit which creates connection data by connecting the apparatus ID, plain-text, personal identification information that identifies a person using the creating apparatus, and time information in a predetermined order;

a signature creating unit which creates the digital signature using the connection data created by said first connecting unit and a common key used only for creating a digital signature;

a second connecting unit which creates signed data by connecting the digital signature with the connection data; and a confirming unit which confirms a working state of said clock, wherein the personal identification information is stored within the signature creating apparatus using a form capable of preventing interpolation, and the signature creating unit encrypts the connection data to create the digital signature, and the second connecting unit outputs the signed data to be transmitted to an external network, said signature creating unit creates the digital signature only when said confirming unit confirms that said clock works normally, stops using the key used only for creating the signature when said confirming unit confirms that said clock does not work normally, and creates an alternate digital signature using connected information which does not include the time information and using a key other than the key used only for creating the signature.

7. A digital signature creating apparatus comprising:

a clock which creates time information;

an ID storing unit which stores an apparatus ID for specifying the creating apparatus using a form capable of preventing interpolation;

a personal identification storing unit which stores personal identification information for specifying a person who has a proper right to update stored contents, the apparatus ID and the personal identification information being stored in a form capable of preventing interpolation;

a first connecting unit which creates connection data by connecting plain-text, the time information, the apparatus ID, and the personal identification information that identifies a person using the creating apparatus in a predetermined order;

a signature creating unit which creates the digital signature using the connection data created by said first connecting unit and a key used only for creating a digital signature;

a second connecting unit which creates signed data by connecting the digital signature to the connection data created by the first connecting unit, the signed data being transmitted to an external network as signal data; and a confirming unit which confirms a working state of said clock, wherein said signature creating unit creates the digital signature only when said confirming unit confirms that said clock works normally, stops using the key used only for creating the signature when said confirming unit confirms that said clock does not work normally, and creates an alternate digital signature using connected information which does not include the time information and using a key other than the key used only for creating the signature.

* * * * *